(12) United States Patent
Enomoto et al.

(10) Patent No.: US 6,211,587 B1
(45) Date of Patent: Apr. 3, 2001

(54) ELECTRIC ROTATING MACHINE

(75) Inventors: Yuji Enomoto; Yukinori Taneda, both of Yokohama; Noriaki Yamamoto, Fujisawa; Suetaro Shibukawa, Hitachinaka; Masaharu Senoh, Narashino; Fumio Tajima, Taga-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/437,261

(22) Filed: Nov. 10, 1999

(30) Foreign Application Priority Data

Nov. 12, 1998 (JP) .................................................. 10-322575
Feb. 8, 1999 (JP) .................................................. 11-030160

(51) Int. Cl.[7] .............................. H02K 9/00; H02K 5/00; H02K 1/12; H02K 3/46
(52) U.S. Cl. ................................. 310/52; 310/91; 310/89; 310/259; 310/260
(58) Field of Search ........................................ 310/260, 259, 310/258, 52, 51, 85, 89, 91, 194, 214, 270

(56) References Cited

U.S. PATENT DOCUMENTS

| 1,756,672 | * | 4/1930 | Barr | 310/259 |
| 4,564,780 | * | 1/1986 | Nel | 310/258 |
| 4,631,433 | * | 12/1986 | Stokes | 310/89 |
| 5,166,565 | * | 11/1992 | Katsuzawa et al. | 310/90 |
| 5,235,228 | * | 8/1993 | Nakanura et al. | 310/51 |
| 5,585,682 | * | 12/1996 | Konicek et al. | 310/89 |
| 5,945,759 | * | 8/1999 | Tanaka et al. | 310/90 |

FOREIGN PATENT DOCUMENTS

| 56-110464 | 9/1981 | (JP) . |
| 3-190543 | 8/1991 | (JP) . |
| 4-87537 | 3/1992 | (JP) . |
| 6-105487 | 4/1994 | (JP) . |
| 6-261475 | 9/1994 | (JP) . |
| 9-9561 | 1/1997 | (JP) . |
| 9-215238 | 8/1997 | (JP) . |

* cited by examiner

*Primary Examiner*—Nestor Ramirez
*Assistant Examiner*—Guillermo Perez
(74) *Attorney, Agent, or Firm*—Mattingly, Stanger & Malur, P.C.

(57) ABSTRACT

For achieving small-sizing and high efficiency by improving heat radiation of coils, and further for simple-construction to be easily disassembled, thereby being environment-friendly from a view point of recycling, an electric rotating machine comprising: a stator 1*a* being constructed by inserting coils 10*a* into slots 11 of a stator core 2*a*; an outer frame 4 being divided into a plurality thereof, so as to cover periphery of the stator core of said stator; a pair of bearing holder portions 6*a* and 6*b*, each having a fitting portion 35*a* or 35*b* to be fitted into an inner diameter reference surface 25*a* at both end portions of said stator and being provided with a bearing 8*a* or 8*b* at an axial center portion thereof, and being attached at both sides of said stator core so as to cover coil end portions dropping out at both sides of said stator; a squeezing mechanism (30, 32*a*, 32*b*, 6*a*, 6*b*) fixing the outer frame at an outer periphery of the stator core, by a wedge function between each of the bearing holder portions and the outer frame due to a squeezing function of attaching the each of said pair of bearing holder portions at both sides of said stator core; and a rotor 3 being formed with an escaping portion for escaping from an outer diameter of a portion opposing to a fitting portion of each of said bearing holder portion, rotatably positioned within said stator core.

34 Claims, 14 Drawing Sheets

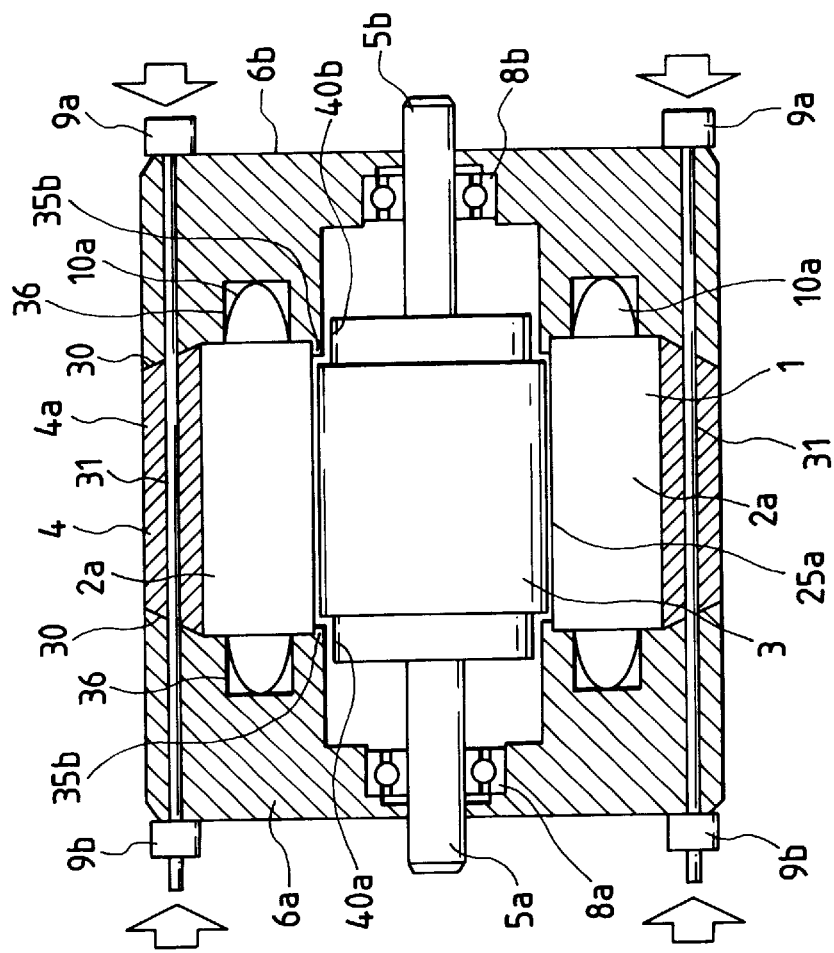
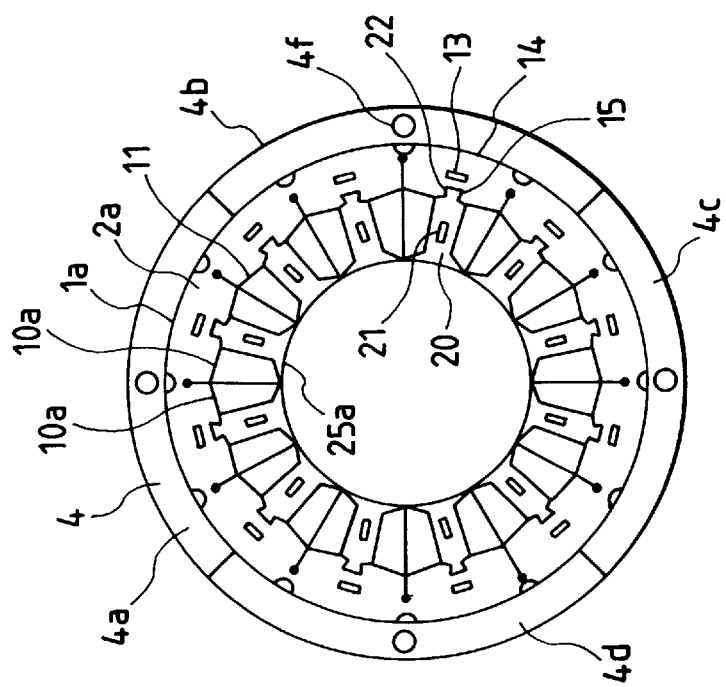
FIG. 3(b)
FIG. 3(a)

A—A CROSS SECTION

ELECTRIC ROTATING MACHINE

BACKGROUND OF THE INVENTION

1. Field of the Invention

The present invention relates to electric rotating machines, each comprising at least a stator and a rotor therein, such as an induction motor, a synchronous motor, a magnet motor, etc.

2. Description of Prior Art

As conventional arts in relation to the above electric rotating machines are already known, for example, Japanese Patent Laying-Open No. Sho 56-110464 (1981), Japanese Patent Laying-Open No. Hei 3-190543 (1991), and Japanese Patent Laying-Open No. Hei 4-87537 (1992).

In the Japanese Patent Laying-Open No. Sho56-110464 (1981), there is described a motor, wherein a bracket (i.e., a portion for holding the bearing) having a bearing for holding an axis of the rotor therein is held on an inner diameter portion (i.e., on an inner diameter reference surface) of the stator, thereby the axes of the above-mentioned stator and the above-mentioned rotor are combined coaxially.

Also, in the Japanese Patent Laying-Open No. Hei 3-190543 (1991), there is described a frame apparatus for the electric rotating machine, having a stator of a circular locus in the inner diameter thereof, and bearing portions for rotatably supporting an axis at a central portion thereof, which pierces through and is fixed to the rotor being positioned opposing to the interior diameter with an aperture between the inner diameter thereof.

End brackets are inserted into the inner diameter of the rotor from the both ends in the axial direction thereof, each having a fitting portion which is formed by bending at least two or more of the leg portions extending in radial directions therefrom into the axial direction of the electric rotating machine, so as to be inserted into the inner diameter thereof. The rests of the leg portions are extended into an outer diameter direction as they are, so as to form or provide projecting portions for the purpose of protection of the coil ends.

Also, in the Japanese Patent Laying-Open No. Hei 4-87537 (1992), there is described an electric rotating machine, being constructed with an E-ring and a gutter for it, which is provided in a shaft, so that, through the shaft piercing through at the center of the rotor in which are inserted windings opposing to the inner diameter side of the stator in a ring shape, two end brackets, each having a stop ring, one pre-pressure spring, and two end brackets are pushed into the inner diameter side at each open side end surface thereof, on both end surfaces of the stator in the axial direction of the shaft at a predetermined pressure. Also, a recess portion and a projection are provided, for stopping the relative movement of both in a rotation direction, on the inner diameter side of the stator and on the open side end surface of the end bracket(s).

In the fields of equipment for industrial use, of household electric appliances, and of automobiles, etc., motors which drive those equipment and appliances are required to be high in the efficiency, as well as small in size and light in the weight thereof. For satisfying such a requirement, a brushless motor begins to be applied into various fields, in which motor a rare earth high performance permanent magnet is applied as the rotor and the windings are wound in high density in the stator.

Classifying the methods for forming winding coils on the stator, they can be roughly divided into two ways, i.e., the one is a concentrated winding and the other is a distributed winding. In the concentrated winding, the coils are wound in each of magnetic pole teeth 57, as shown in FIG. 12 (*a*), for example. While, in the distributed winding, the coils are wound bridging over a plurality of magnetic pole teeth 57, as shown in FIG. 18.

To the concentrated winding, in general, a direct winding method is applied. With this method, on the inner diameter of the stator core, the coils are wound into the stator slots, directly by driving a nozzle through which an enamel wire passes. With this method, however since the coils are wound with being twisted from the inner periphery side of the core, it is impossible to wind the coils in alignment, and there occurs many portions where the wires intersect or cross each other. As a result of this, there is a limit for reducing the height of the coil ends.

Also, as the method for the distributed winding, an inserter method is common, in which the both sides of the coil are compulsively slid or slipped into the slots from the opening portions thereof at the same time in the direction of the outer diameter, so as to be inserted therein. However, there are still limits in the high density of the windings, and as well as in the height of the coil end.

Then, there is known a method for forming the concentrated winding with high density, for example, in Japanese Patent Laying-Open No. Hei 6-105487 (1994) or Japanese Patent Laying-Open No. Hei 6-261475 (1994), in which is shown a method of installing the coils wound on bobbins onto the divided cores. Also, as a method for forming the distributed windings with high density, in Japanese Patent Laying-Open No. Hei 9-215238 (1997), there is shown a method for reducing the height of the coil ends by forming each coil end into a predetermined shape.

Also, in a case of a motor on which is required a high load drive, Joule's heat occurring in the stator coils when being driven. Therefore a cooling construction is important for realizing such a motor with high efficiency. As a method for achieving such a cooling, there is shown a cooling method for the motor, in which a passage(s) for coolant is provided in a housing, for example, in Japanese Patent Laying-Open No. Hei 9-9561 (1997).

In the Japanese Patent Laying-Open No. Sho 56-110464 (1981) mentioned above, since the motor is constructed such that the axial length of the rotor is shorter than that of the stator, it is impossible for the rotor to effectively utilize the magnetic flux generated by the stator. Therefore it has a drawback that the torque efficiency thereof is decreased when it is small-sized.

Also, in any one of the conventional arts mentioned above, no consideration is paid for an aspect of achieving the small-sizing and the high efficiency in the electric rotating machine, by greatly improving heat radiation property of the coils thereof, nor of achieving good or superior property in disassembling with simple construction thereof.

SUMMARY OF THE INVENTION

An object according to the present invention is, for overcoming the problems mentioned above, to provide an electric rotating machine, that can to obtain the down-sizing and the high efficiency by greatly improving heat radiation property of the coils, and as well as being environment-friendly from a view point of recycling, while being simple in the construction and also having a good disassembling property therewith.

Further, another object, according to the present invention, is to provide an electric rotating machine, being able to obtain the small-sizing and the high efficiency by greatly improving the heat radiation property of the coils, as well as being environment-friendly from a view point of recycling with being simple in the construction and also having the good disassembling property therewith, and further obtaining cost-reduction by greatly improving the assembling property thereof.

Further, in recent years, accompanying the further requirements for higher efficiency and more down-sizing of the electric rotating machine, as the products, it is important for the motor to be made thin and to have good heat radiation.

A cross section view of the conventional motor is shown in FIG. 20. Here in the figure, a referencenumeral 51 depicts a motor, 52 a housing, 55 a stator, 56 a stator core, 63 stator coils, 64 coil ends of the stator core, 65 a rotation shaft, 66 and 67 bearings, 68 a rotor, 69 a permanent magnet provided on the rotor, 72 connection portions of the coils, 75 connectors, and 91 and 92 motor brackets positioned in the axial direction of the motor.

In shortening in the size L (the size in the axial direction of the motor) in the figure, there is a limit in according only with the conventional art. The reason of this lies in that, first, a predetermined distance for insulation is necessary from the stator coil 63 to the bracket 91, or 92, in the upper portion of the coil end and in the axial direction thereof. Second, the heat radiation of the stator coils 63 is achieved mainly through the core 56 contacted thereto, and the heat radiation of the coil ends 64 depends on the heat radiation through the coil to the core.

Also, since the wire becomes thick in the diameter when the output of the motor comes to be large, ineffective or useless apertures are formed between the coils. This means that the spaces inferior in heat radiation are increased, in spite of the increase of heat generation due to the increase of the output.

As a conventional art for overcoming this problem, there is known a method, wherein the stator, on which the coils are mounted, is molded with resin, thereby to obtain reduction in electromagnetic vibration of the coils and improvement in tightness of the stator, as well as in the property of heat radiation of the coils.

However, when forming the resin molding together with the coils, there can be a problem in which an insulator film layer of the coil is broken, thereby resulting in a short circuiting between the wires or lines thereof.

According to the present invention, in consideration of the aspects mentioned above, there is provided a motor, which is improved in the heat radiation, with obtaining the down-sizing of the motor, by a method being different from the molding.

Further, other object is to provide a motor of properties of low vibration and high heat radiation.

For achieving the object mentioned above, according to the present invention, there is provided an electric rotating machine comprising: a stator being constructed by inserting coils into slots of a stator core thereof; an outer frame being divided into a plurality thereof, so as to cover periphery of the stator core of said stator; a pair of bearing holder portions, each being provided with a bearing at an axial center portion thereof, and being attached at both ends of said stator core so as to cover coil end portions dropping out at both sides of said stator; a fixing mechanism for fixing said outer frame at an outer periphery of the stator core, in connection with each of the bearing holder portions and said outer frame, by means of a function of attaching each of said pair of bearing holder portions at both sides of said stator core; and an inner rotor (a cylindrical rotor) being rotatably supported by the bearings, each of which is provided in each of said bearing holder portions, respectively, and also being rotatably positioned within an inner diameter of said stator core at a desired distance therefrom.

Also, according to the present invention, there is provided an electric rotating machine comprising: a stator being constructed by inserting coils into slots of a stator core thereof; an outer frame being divided into a plurality thereof, so as to cover periphery of the stator core of said stator; a pair of bearing holder portions, each being provided with a bearing at an axial center portion thereof, and being attached at both ends of said stator core so as to cover coil end portions dropping out at both sides of said stator; a squeezing mechanism for fixing said outer frame at an outer periphery of the stator core, by a wedge function between each of said bearing holder portions and the outer frame due to a squeezing function of attaching the each of said pair of bearing holder portions at both sides of said stator core; and an inner rotor (a cylindrical rotor) being rotatably supported by the bearings, each of which is provided in each of said bearing holder portions, and also being rotatably positioned within an inner diameter of said stator core at a desired distance therefrom.

Also, according to the present invention, there is provided an electric rotating machine comprising: a stator being constructed by inserting coils into slots of a stator core thereof; an outer frame being divided into a plurality thereof, so as to cover periphery of the stator core of said stator; a pair of bearing holder portions, each having a fitting portion to be fitted into one of inner diameter reference surfaces at both end portions of said stator and being provided with a bearing at an axial center portion thereof, and being attached at both ends of said stator core so as to cover coil end portions dropping out at both sides of said stator; a fixing mechanism for fixing said outer frame at an outer periphery of the stator core, in connection with each of the bearing holder portions and said outer frame, by means of a function of attaching each of said pair of bearing holder portions to both sides of said stator core; and an inner rotor (a cylindrical rotor) being rotatably supported by the bearings, each of which is provided in each of said bearing holder portions, having an axis being longer than axial length of the stator core of said stator, being formed with an escaping portion for escaping from an outer diameter of a portion opposing to a fitting portion of each of said bearing holder portion, and also being rotatably positioned within an inner diameter of said stator core at a desired distance therefrom.

Further, according to the present invention, there is provided an electric rotating machine comprising: a stator being constructed by inserting coils into slots of a stator core thereof; an outer frame being divided into a plurality thereof, so as to cover periphery of the stator core of said stator; a pair of bearing holder portions, each having a fitting portion to be fitted into one of inner diameter reference surfaces at both end portions of said stator and being provided with a bearing at an axial center portion thereof, and being attached at both sides of said stator core so as to cover coil end portions dropping out at the both sides of said stator; a squeezing mechanism for fixing said outer frame at an outer periphery of the stator core, by a wedge function between each of said bearing holder portions and the outer frame due to a squeezing function of attaching the each of said pair of bearing holder portions at both sides of said stator core; and an inner (a cylindrical rotor) rotor being rotatably supported by the bearings, each of which is provided in each of said pair of bearing holder portions, having an axis being longer than axial length of the stator core of said stator, being formed with an escaping portion for escaping from an outer diameter of a portion opposing to a fitting portion of each of said bearing holder portion, and also being rotatably positioned within an inner diameter of said stator core at a desired distance therefrom.

Also, according to the present invention, in the electric rotating machine as defined in the above, wherein said squeezing mechanism is constructed with a screw mechanism for jointing a first tapered portion extending into an axial direction toward an axial center, formed at both sides of the outer frame, and a second tapered portion extending in the axial direction toward the axial center, formed on a side surface of each bearing holder portions.

And, also according to the present invention, in the electric rotating machine as defined in the above, wherein gutters for inserting the coil end portions therein are formed in each of said pair of bearing holder portions.

Further, according to the present invention, in the electric rotating machine as defined in the above, wherein resin is injected in said gutters.

Further, also according to the present invention, in the electric rotating machine as defined in the above, wherein said stator is constructed by connecting on the ring-like core a plurality number of teeth, in which are inserted the wound coils in advance.

Further, according to the present invention, in the electric rotating machine as defined in the above, wherein said rotor is constructed with a cage-type rotor.

And, further according to the present invention, in the electric rotating machine as defined in the above, wherein said rotor is constructed with a magnet type rotor.

And also, according to the present invention, there is provided an electric rotating machine comprising: a stator being constructed by inserting coils into slots of a stator core thereof; a first bearing holder portion, having a fitting portion to be fitted to an outer diameter reference surface at one end of said stator, being provided with a bearing at an axial center portion thereof, and being attached at one end of said stator core so as to cover coil end portions dropping out at the one end of said stator; a second bearing holder portion, having a fitting portion to be fitted to an outer diameter reference surface at the other end of said stator, and being attached at the other end of said stator core so as to cover coil end portions dropping out at the other end of said stator; and a cylindrical rotor (an outer rotor) being rotatably supported by the bearing provided in said first bearing holder portion, being formed with an escaping portion for escaping from an outer diameter of a portion opposing to a fitting portion of said first bearing holder portion, and also being rotatably positioned within an inner diameter of said stator core at a desired distance therefrom.

Also, according to the present invention, there is provided an electric rotating machine comprising: a stator being constructed by inserting coils into slots of a stator core thereof; a first bearing holder portion, having a fitting portion to be fitted to an outer diameter reference surface at one end of said stator, being provided with a bearing at an axial center portion thereof, and being attached at one end of said stator core so as to cover coil end portions dropping out at the one end of said stator; a second bearing holder portion, having a fitting portion to be fitted to an outer diameter reference surface at the other end of said stator, and being attached at the other end of said stator core so as to cover coil end portions dropping out at the other end of said stator; and a cylindrical rotor (an outer rotor) being rotatably supported by the bearing provided in said first bearing holder portion, having an axis being longer than axial length of the stator core of said stator, being formed with escaping portions for escaping from outer diameters of portions opposing to the fitting portions of said first and second bearing holder portions, and also being rotatably positioned within an inner diameter of said stator core at a desired distance therefrom.

And also, according to the present invention, there is provided an electric rotating machine comprising: a stator being constructed by inserting coils into slots of a stator core thereof; a pair of bearing holder portion, each having a fitting portion to be fitted to an outer diameter reference surface at both ends of said stator and being provided with a bearing at an axial center portion thereof, and being attached at the both ends of said stator core so as to cover coil end portions dropping out at the both ends of said stator; and a cylindrical rotor (an outer rotor) being rotatably supported by the bearings, each of which is provided in each of said pair of bearing holder portions, having an axis being longer than axial length of the stator core of said stator, being formed with escaping portion for escaping from each outer diameter of a portion opposing to the each fitting portion of said bearing holder portions, and also being rotatably positioned within an inner diameter of said stator core at a desired distance therefrom.

As is mentioned in the above, it has such the construction that the outer frame is constructed with a plurality of portions divided in peripheral directions thereof, that at one or both of end portions in the axial direction of the outer frame is/are formed a tapered portion(s) for performing wedge function, and that the divided outer frame is fixed onto an outer periphery of the stator core by means of the fixing mechanism (or the squeezing mechanism) for compressing in the axial direction with a member, such as the bearing holder portion, etc., having the tapered portion for performing the wedge function from the axial direction, therefore the outer frame and the stator core, and further the bearing holder portions can be disassembled with ease, and also the core and the coils are also can be disassembled with ease in a case where the core has such the dividable structure, thereby providing a motor being superior in property for recycling thereof.

Also, it is so constructed that the bearing holder potion has a shape being same to that of the coil end portion of the stator coils so as to contact with that coil end portion, thereby enabling to escape the heat generated outside, from the coil end portion with high efficiency, to realize the small-sizing thereof.

Further, with the rotor, wherein it has an axis being longer than that of the axial length of the stator core and is formed with the escaping portion in the inner diameter of a portion opposing to each fitting portion of the bearing holder portions, it is possible to realize a small-sized motor with large output, by effectively utilizing the magnetic flux generated from the stator so as to make the decrease in the torque small.

Also, the stator is constructed so that the coil as a whole being shaped by compression is inserted into each of the slots so as to obtain high space factor, therefore it is possible to realize a small-sized motor with large output.

Further, according to the present invention, there is provided electric rotating machine comprising: a stator being positioned with magnetic pole teeth therein; a stator coil being wound round on each of the magnetic pole teeth or being wound covering a plurality of the magnetic pole teeth;

and a bracket being positioned in an axial direction of said electric rotating machine, wherein projections are provided inside said bracket, to be entered into apertures defined between coil ends of said stator coil neighboring to each other.

Also, according to the present invention, there is provided an electric rotating machine comprising: a stator being positioned with magnetic pole teeth therein; a stator coil being wound round on each of the magnetic pole teeth or being wound covering a plurality of the magnetic pole teeth; and a bracket being positioned in an axial direction of said electric rotating machine, wherein coolant passage is provided inside said bracket, with being projected to be entered into apertures defined between coil ends of said stator coil neighboring to each other.

Also, according to the present invention, there is further provided an electric rotating machine comprising: a stator being positioned with magnetic pole teeth therein; a stator coil being wound round on each of the magnetic pole teeth or being wound covering a plurality of the magnetic pole teeth; and a bracket being positioned in an axial direction of said electric rotating machine, wherein an elastic body is having insulating property therewith is positioned on an inside surface of the bracket, and the elastic body lies between coil ends of said stator coil and the inside surface of the bracket.

Here, explanation will be given below on the effects according to the present invention.

Before giving the explanation, the general tendency of the stator core will be described. Accompanying high output and high efficiency of the motor, there is a necessity of reducing current density, therefore the coil must be large in the wire diameter thereof. Accordingly, for ensuring the film strength of the wire when being wound, the minimum winding radius of the wire comes to be large, and the configuration of the coil ends comes to be in an arc-like shape. In this instance, the aperture defined between the neighboring coil ends also come to be large, thereby forming the useless aperture between the coils.

According to the present invention, by inserting into the apertures the projections provided on the motor bracket, the distance between the motor bracket and the coil ends comes close substantially to each other (in other words, the useless apertures between the coil ends are removed), as a result of this, heat radiation route is ensured for conducting the heat generated from the coil end through the projections to the motor bracket, so as to increase the property of radiating the heat.

Also, according to the present invention, the coolant passage, being projected to be inserted from the motor bracket into the apertures between the coil ends, performs the function as the projections of the first invention, and in particular, since those projections are constructed with the coolant passage, the property of heat radiation of the stator coil is increased furthermore.

Further, according to the present invention, since the motor is assembled with laying the elastic body of good thermal conductivity between the stator coil and the motor bracket, no short-circuit occurs between the wires of the stator coils, and also the elastic body performs the heat radiation function after the use of the function thereof, therefore it is possible to realize a motor with low vibration and high heat radiation property.

BRIEF DESCRIPTION OF THE DRAWINGS

FIGS. 3(a) and (b) are cross section views of showing the actual structure of the embodiment of the electric rotating machine, such as the induction motor, the synchronous motor, etc., according to the present invention;

DETAILED DESCRIPTION OF PREFERRED EMBODIMENT(S)

Hereinafter, electric rotating machines according to embodiments of the present invention will be fully explained by referring to the attached drawings.

Figure 1:
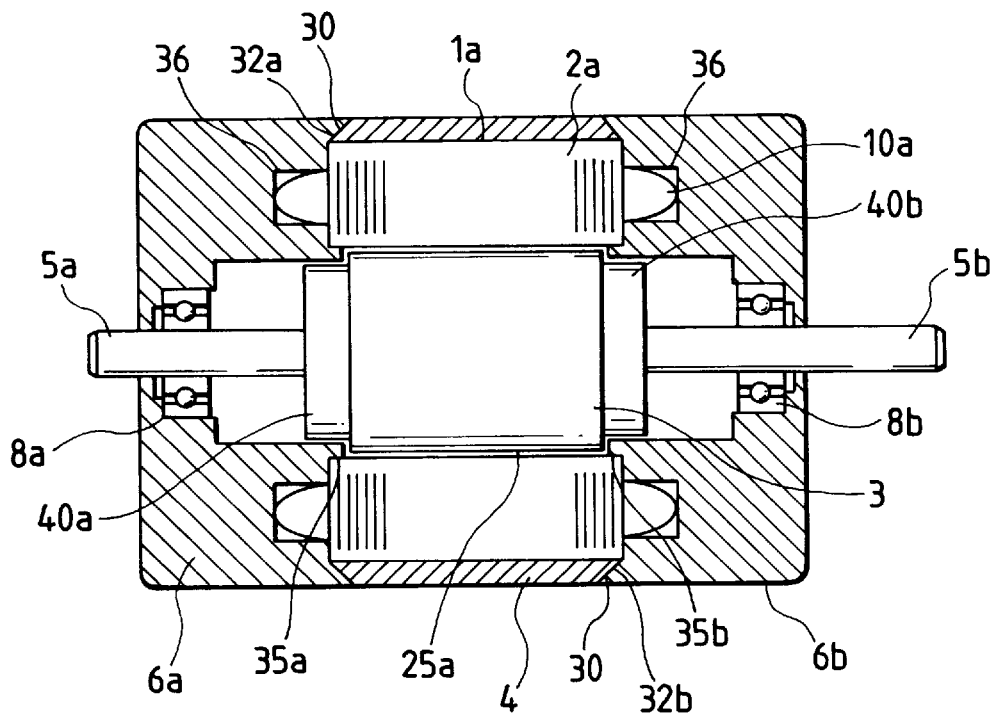
FIG. 1 is a cross section view of showing the basic structure of an embodiment of an electric rotating machine according to the present invention.
Figure 4A:
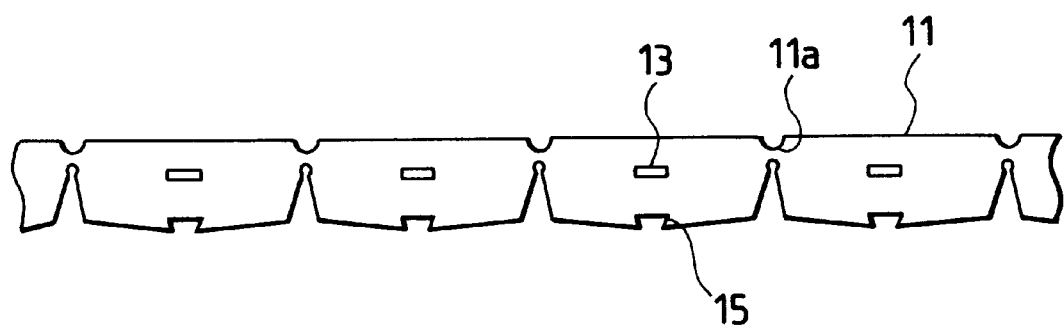
FIGS. 4(a) and (b) are views of explaining one embodiment of manufacturing an outer peripheral portion of a stator core, according to the present invention.
Figure 4B:
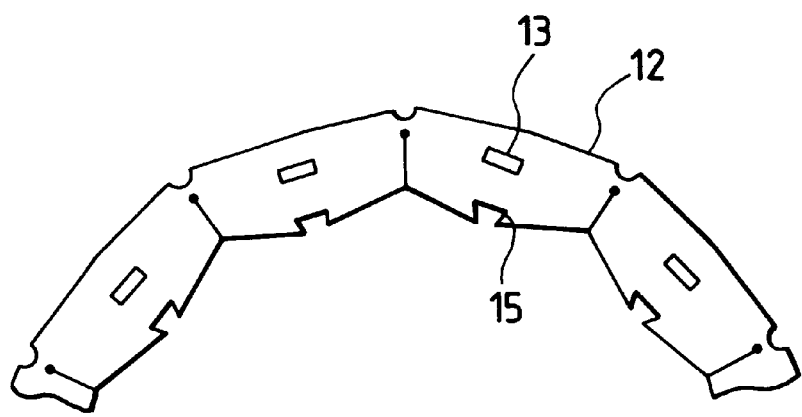

In FIG. 1, there is shown the basic construction of an electric rotating machine according to one embodiment of the present invention. Namely, the electric rotating machine, such as an induction motor, a synchronous motor, etc., according to the present invention, is constructed with a stator 1a and a rotor 3, wherein the stator 1a comprises a core 2a, being formed by compiling or laminating silicon steel plates, for example, and coils 10a which are inserted into slots 11 (shown in FIG. 3(a)) of the said core 2a with high space factor, thereby positioning or inserting the coils 10a into the slots with high space factor, which are provided in a large number thereof in the stator core 2a, as shown in the FIG. 3(a). Also, the rotor 3 has such the structure that axes 5a and 5b are combined or connected to a portion forming the body of the rotor 3, i.e., a rotor 3a having a conductor in a cage shape, if it is an induction motor, or the axes 5a and 5b being connected to a rotor 3b having pasted a permanent magnet(s) around it, or a rotor 3c, into which permanent magnets are buried within the laminated cores of silicon steel sheet, if it is a magnet motor. The shape thereof includes a cylindrical one in a portion of the stator 1a. Further, in a method for manufacturing the stator core 2a of a divided core, first, there is obtained the cores shown in FIG. 4(a) through press forming of the silicon steel sheet, and an outer periphery portion 12 of the core is formed in the cylindrical shape, as shown in FIG. 4 (b), by bending those laminated silicon steel sheets 11 formed through the press forming around a center of a portion 11athereof. Those formed cores are laminated with the outer periphery portion 12, and are caulked at a caulking portion 13 with a material, such as aluminum, thereby manufacturing the outer periphery portion 12 of the core. Next, in the similar manner, for example, laminating the silicon steel sheets, which are formed through the press forming in a tooth shape, and caulking them at the caulking portion 21 with the material, such as aluminum, as shown in FIG. 3(a), thereby tooth portions 20 of the divided core can be manufactured. Next, the coil 10a is wound around on each of the tooth portions 20 of the divided core formed in this manner in alignment, and is shaped by compression thereof, and the projection portions 22 of the tooth portions 20 of the divided care is inserted or fitted into gutters 15 formed on an inner periphery of the outer periphery portion 12 to be fixed thereto, thereby inserting the coils in the core and enabling to manufacture the stator 1a having the coils 10a of high space factor. Accordingly, the inner periphery 25a of the stator core 2a, forming a reference surface when assembling (this reference surface also determines an aperture between the rotor 3 and the stator 1a), comes to be an inner periphery of the teeth portion 20 of the divided core, in the case of the divided cores.

As the structure for performing the alignment in the axes between the rotor 3 and the stator 1a, in the electric rotating machine having the inner rotor structure as shown in the FIG. 1, there is taken a method, in which the assembling is performed, by making the outer periphery of the fitting portions 35a and 35b of the bearing holder portions 6a and 6b formed from material, such as aluminum, iron, resin, etc., and the inner periphery portion 25a of the stator core 2a, directly as the reference surface. In this instance, since it has such the structure that the fitting portions 35a and 35b of the bearing holder portions 6a and 6b project by 1 to 3 mm in the inner periphery side than the inner periphery portion 25a of the stator 2a, therefore it is constructed so as to have a cutting portion (s) being about 1 to 3 mm in the depth thereof (i.e., in the shape of being thinned by about 2 to 6 mm in the outer diameter), for the purpose that the both end portions 40a and 40b of the rotor 3 brings bout no interference with that portion (s), as well as for utilizing the magnetic field generated from the stator 1a effectively even in the cutting portion (an escaping portion), so as to sparsely bring about the decrease in the rotation torque therewith. Namely, the insertion portions 35a and 35b may be made 1 to 3 mmin the thickness, while the cutting portion (s) be about 2 to 5 mm in the depth thereof. With this, it is possible to assemble the bearing holder portions 6a and 6b directly onto the stator 1a, without touching to each other, with no processing nor machining for fitting on an outer frame 4, even if the aperture, being called by an air gap defined between the stator core 2a and the rotor 3 is small, such as being equal or less than 1 mm, thereby enabling to reduce the number of steps in the assembling works, greatly.

Further, by making the structure of the outer frame 4 being made of the metal, such as aluminum, iron, etc., as shown in the FIG. 3(b), i.e., dividing it into a plurality ones 4a to 4d in radial direction thereof, each being a semi-cylindrical shape and formed with the tapered portion 30 at both ends or one end in the axial direction thereof, and further by supplying them with compressive force in the axial direction by means of a squeezing mechanism (or a fixing mechanism), such as bolts 9a and nuts 9b, etc., through a material(s), such as the bearing holder portions 6a and 6b having tapered portions 32a and 32b formed from the axial direction, at both ends thereof in axial direction, it is possible to construct so that the divided outer frames 4a to 4d are compressed into the direction of inner periphery thereof, so as to fix the stator core 2a in a manner like wrapping it therein. Namely, due to the wedge function, wherein the tapered shape portions 30 of the outer frame 4 (i.e., in the tapered shapes extending into the axial direction towards the center of axis) and the tapered shape portions 32a and 32b of the bearing holder portions 6a and 6b are engaged with each other by a means of the squeezing mechanism (or the fixing mechanism) only, for supplying the compressive force to the bearing holder portions 6a and 6b in the axial direction so that the bearing holder portions 6a and 6b are fixed to only both sides of the stator core 2a, therefore it is possible to fix the bearing holder portions 6a and 6b and the divided outer frame 4 to the stator core 2a. Accordingly, when disassembling, by loosing the squeezing mechanism (or the fixing mechanism), such as the bolts 9a and nuts 9b, they can be easily disassembled.

In the FIGS. 1 and 3, though the bearing holder portions 6a and 6b are formed in symmetrical so as to have the same shape in the cross section thereof, however there is no necessity for them to have the same shape in the cross section in symmetric, as far as the fitting portion 35a and 35b are formed and the tapered portions 32a and 32b are formed in each, and further the bearings 8a and 8b are attached for supporting the axis portions 5a and 5b of the rotor 3, thereby to construct them to cover the end portions of the coils 10a so that the heat at the end portions of the coils 10a can be radiated easily. Namely, it is possible to radiate the heat generated by the end portions, by constructing the bearing holder portions 6a and 6b to cover the end portions of the coils 10a projecting in both sides from the stator core 1a with contacting thereto, in the manner of wrapping them therein. In particular in the bearing holder portions 6a and 6b, by injecting resin, such as an adhesive being superior in thermal conductivity, into the gutters 36 into which the coil end portions are inserted to be harden therein, it is possible to increase the area in contact with the coil end portions and the bearing holder portions, thereby enabling to radiate the heat from the coil end portions more effectively. In brief, the side surface (bottom surface) 37 (shown in FIG. 9) of each of the bearing holder portions 6a and 6b are brought into contact with both side surfaces of the stator core 2a closely, except for the gutter portions 63 thereof, therefore also the heat in the stator core 2a can be radiated from the bearing holder portions 6a and 6b.

Figure 2:
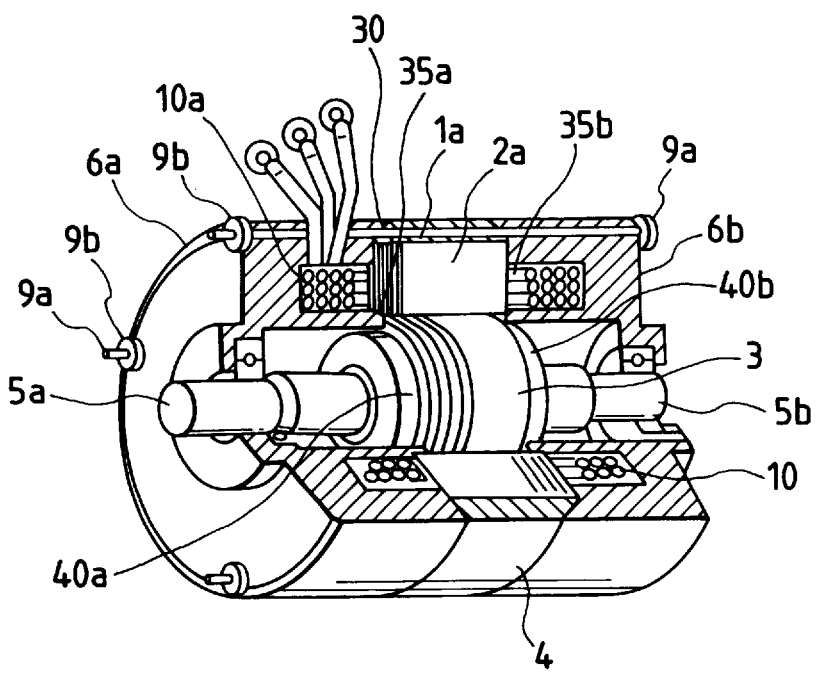
FIG. 2 is a perspective view, including a partial cross section view thereof, for showing the actual structure of the embodiment of the electric rotating machine, such as an induction motor, a synchronous motor, etc., according to the present invention.

In FIGS. 2 and 3, there is shown the actual structure of the embodiment of the electric rotating machine, such as an induction motor, a synchronous motor, etc., according to the present invention. In FIG. 3(a), there is shown a relationship between the stator core 1a, being formed by inserting the coils 10a into the slots 11 of the stator core 2a with high space factor, and the outer frame 4, and in FIG. 3(b) the construction of the electric rotating machine as a whole. In general, the motor is constructed by the outer frame 4 wrapping around the outer periphery of the stator core 2a, as shown in the FIG. 3(a). In this manner, with such the construction of wrapping around the outer periphery of the stator core 2a, it is possible to suppress electromagnetic vibration which the motor generates.

According to the present invention, the outer frame 4 is divided into four (4a to 4d) in the radial directions, for example, and are so constructed that stresses are applied onto the core 2a in the four directions thereof. The outer frame 4 is formed with penetrating bores 31 in the structure thereof. FIG. 3(b) shows the assembling structure. After assembling the outer frames 4a to 4d on the outer periphery surface of the core 2a, the bearing holder portions 6a and 6b are assembled from both sides of the axial direction thereof. As the method for squeezing is applied the squeezing mechanism, such as bolts 9a and nuts 9b, etc., and it is so constructed that the stresses are applied in the inner periphery direction through the tapered portions 30 which are provided at both ends of the axial direction of the outer frames 4a to 4d, by compressing them in the axial direction thereof.

Figure 5C:
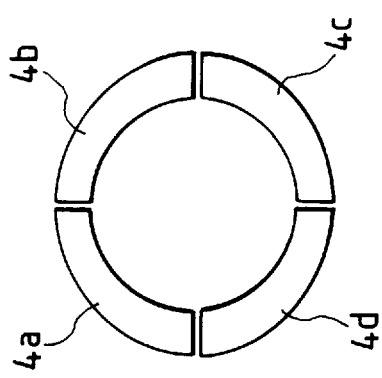
FIGS. 5(a) to (c) are views of explaining squeezing or tightening structure for an outer frame, according to the present invention.
Figure 5B:
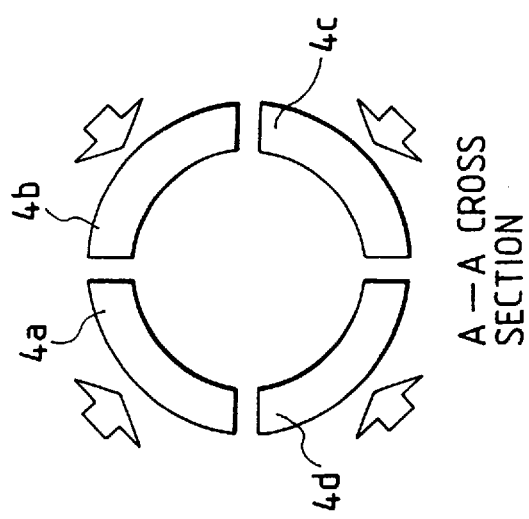
Figure 5A:
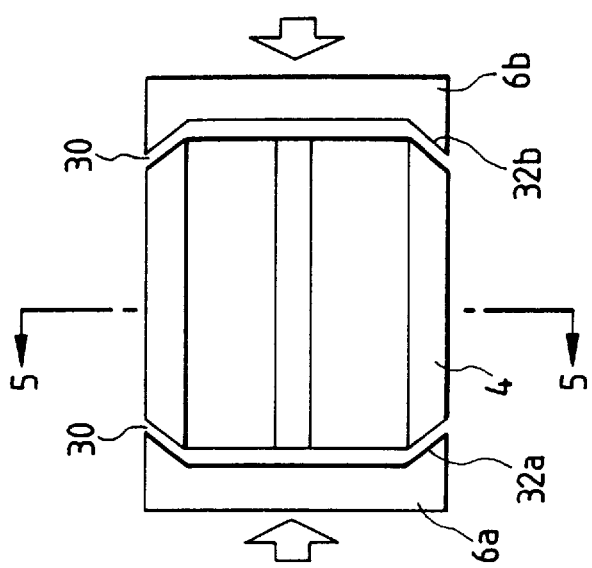

Next, a method for squeezing the outer frame 4 being divided into a plurality ones, according to the present invention, will be explained in more detail by referring to FIGS. 5. In the FIG. 5(a), there are shown the structures of the outer frame 4 and the bearing holder portions 6a and 6b. In the FIG. 5(b) are shown the cross sections thereof. When compressing the bearing holder portions 6a and 6b with applying the stress in the axial direction thereof, due to the relationship between the tapered portions 32a and 32b provided at the bearing holder portions 6a and 6b and the tapered portions 30 provided at the both ends of the outer frame 4 in the axial direction thereof, the outer frame 4 generates stress towards the inner periphery in the radial direction thereof, therefore it is possible to make the inner diameter of the outer frame 4 smaller than that of the original one, as shown in the FIG. 5(c). As a result of this, it is possible to fix the bearing holder portions 6a and 6b at the stator 1a, i.e., at the inner periphery reference surface 25a of the stator core 2a, as well as to fix the outer frame 4 in a manner of wrapping the stator 1a therein.

Figure 6B:
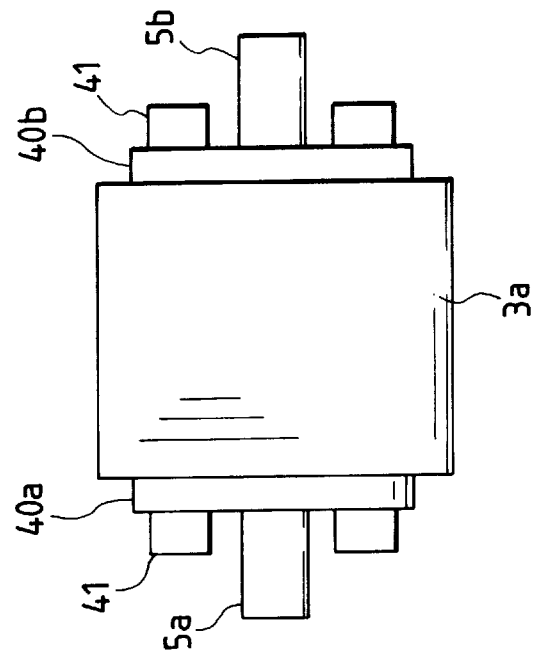
FIGS. 6(a) to (c) are views of showing one embodiment of the structure of a cage rotor for use in the induction motor, according to the present invention.
Figure 6A:
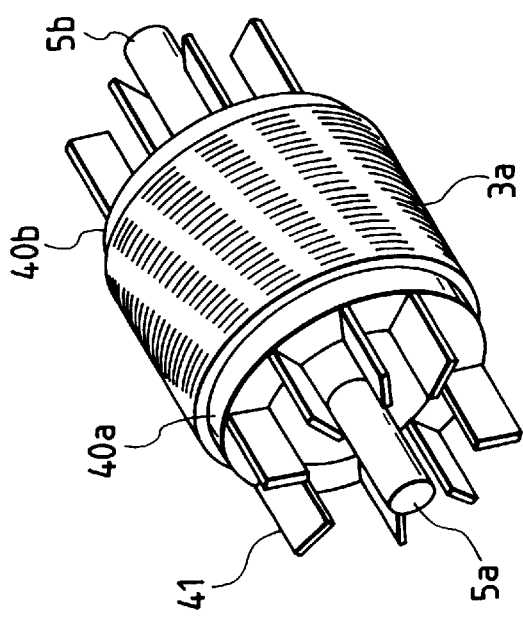
Figure 6C:
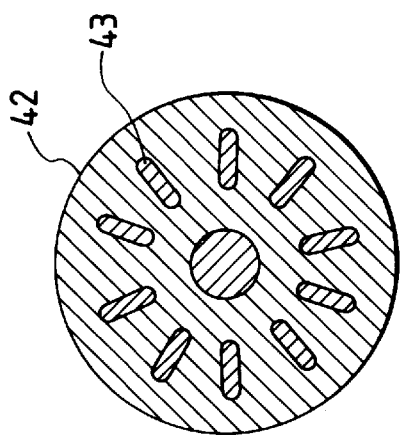

Next, the structure of the rotor 3 according to the present invention will be explained in more details, by referring to FIGS. 6 and 7. The FIG. 6 shows the rotor 3a of a cage-type for the induction motor. As was mentioned in the above, the bearing holder portions 6a and 6b are assembled by making use of the outer peripheries of the fitting portions 35a and 35b and the inner periphery portion (surface) 25a as the reference surfaces, directly, in the method thereof, then it is so constructed that the fitting portions 35a and 35b of the bearing holder portions 6a and 6b project into the inner periphery side than the inner periphery surface 25a of the stator 1. Therefore, the rotor 3a has a necessity to be shaped so that it brings about no interference with the fitting portions 35a and 35b of the bearing holder portions 6a and 6b at that portion thereof, therefore, as shown in the FIG. 6(b), it is so constructed that cutting portions 40a and 40b are formed by cutting the outer configurations at both ends of the rotor 3a (i.e., it is thinned a little bit at the fitting portions 35a and 35b) so as to avoid the interference. The reason why the cage-type rotor 3a is shaped with the cutting portions at both ends thereof lies in that torque can be generated by the magnetic field provided from the stator 1, even at the both ends of the rotor 3a. Namely, even if the both ends of the rotor 3a are cut by a little bit from the thickness at the fitting portions 35a and 35b as they are, there scarcely occurs the decrease in the torque, comparing to that without such the cuttings. Also, even comparing to the case where the both ends are cut or removed completely, it is also possible to prevent from the decrease in the torque, thereby to achieve the induction motor with good or high efficiency. Further, the cross section of the cage-type rotor 3a is shown in the FIG. 6(c). The cage-type rotor 3a is formed as an unified or integrated single unit or body, for example, by injecting aluminum 43 into the laminated silicon steel sheets 42. Furthermore, at the both ends of the cage-type rotor 3a are formed fins 41 for cooling the bearing holder portions 6a and 6b.

Figure 7A:
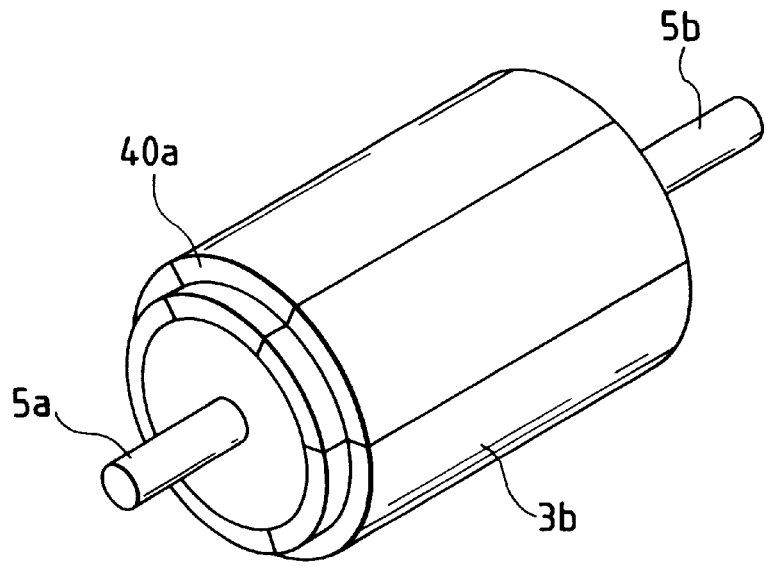
FIGS. 7(a) and (b) are views of showing one embodiment of the structure of a magnet rotor for use in the magnet motor, according to the present invention.
Figure 7B:
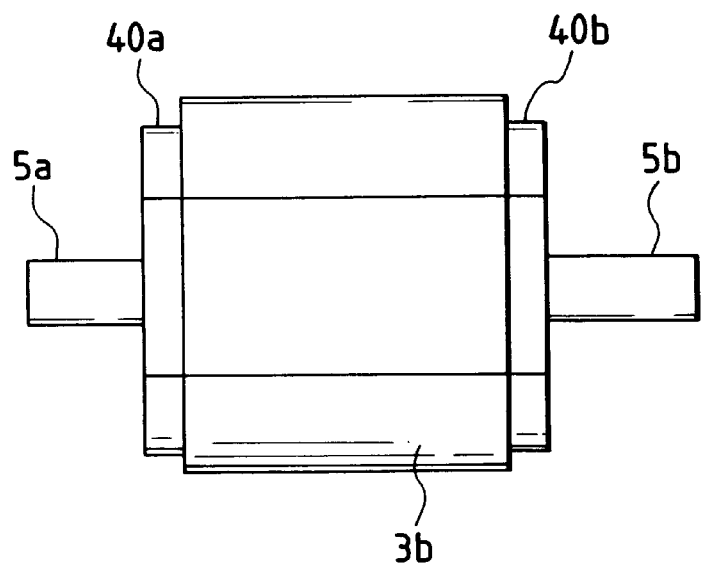

Also in the same manner as the magnet type rotor 3b, with provision of the cutting portions 40a and 40b by cutting the both ends of the magnets as shown in the FIGS. 7, it is constructed so as to escape from the interference with the fitting portions 35a and 35b of the bearing holder portions 6a and 6b. In such the magnet-type rotor 3b, even if cutting the both ends of the magnet, there scarcely occurs the decrease in the torque, comparing to that without such the cuttings. Also, comparing to the case where the both ends are cut or removed completely, it is also possible to prevent from the decrease in the torque, thereby to achieve the induction motor with good or high efficiency.

Figure 8:
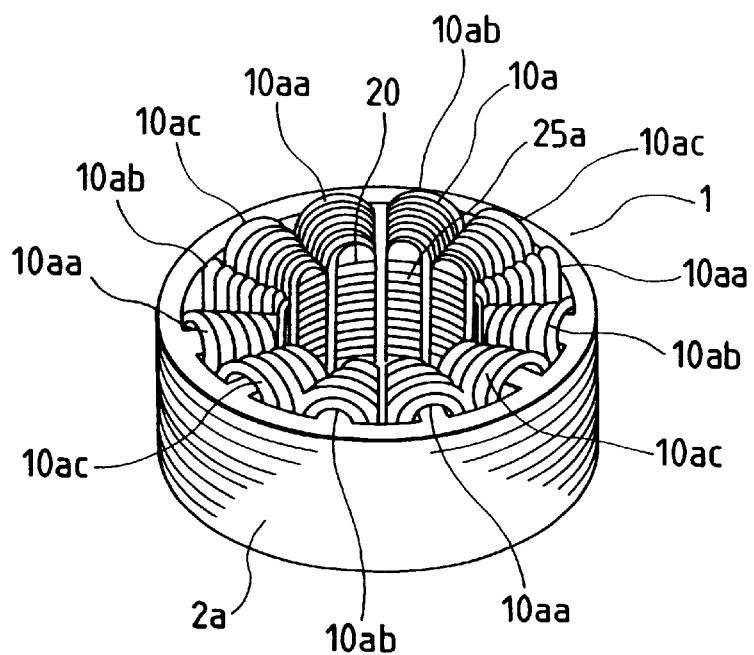
FIG. 8 is a perspective view of showing an embodiment of a stator having coil end portions, according to the present invention.
Figure 9A:
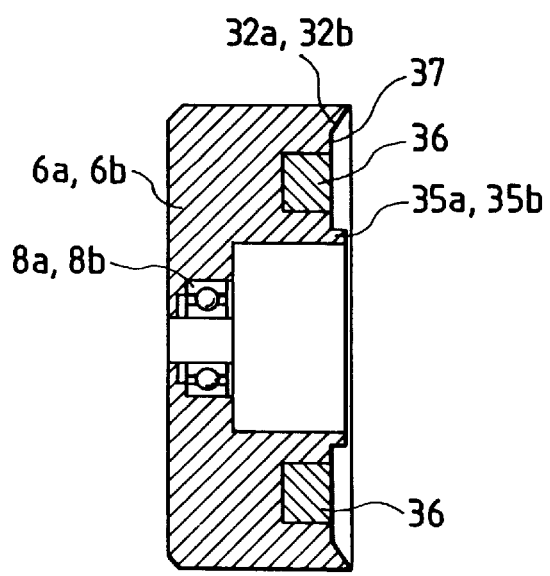
FIGS. 9(a) and (b) are views of showing an embodiment of bearing receiving portions, according to the present invention.
Figure 9B:
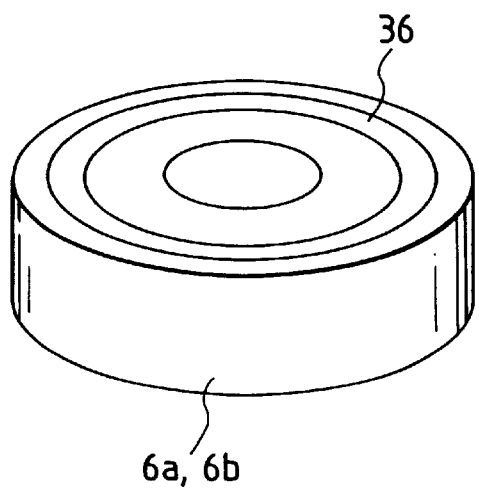

Next, the bearing holder portions 6a and 6b, according to the present invention, will be explained in more detail by referring to FIGS. 8 and 9. The stator 1a has the structure so that the end portions of the coil 10a project from the stator core 2a towards both sides thereof. Further, the coils 10a are constructed with three phases thereof, such as, a coil 10aa connected in series or parallel, a coil 10ab connected in series or parallel, and a coil 10ac connected in series or parallel, wherein each of the coils 10aa, 10ab and 10ac is aligned and wound in each tooth 20, thereby to be installed in a form, being shaped in the cross section thereof as a whole. Accordingly, in the bearing holder portions 6a and 6b, as shown in the FIG. 9, are formed gutters 36 for inserting the coil ends therein. And, when the fitting portions 35a and 35b of the bearing holder portions 6a and 6b are fitted into the inner periphery surface of the stator core 2a to be fixed thereto, the end coil portions projecting at both sides of the stator core 2a are inserted into the gutters 36 and are brought in contact therewith, thereby it is possible to improve the thermal conductivity of the heat generated from the coil. Further, by injecting a liquid, such as an adhesive, into the gutters 36 to be harden therein, it is possible to increase the contact area between the end coil portions and the bearing holder portions 6a and 6b, so as to further improve the property of heat radiation. In any way, the fitting portions 35a and 35b of the bearing holder portions 6a and 6b and bottom portions 37 of recess forming the tapered portions 32a and 32b are abutted to the both side surfaces of the stator core 2a, and further they contact therewith in the manner of wrapping the end coil portions by means of the gutters 36, therefore it is possible to radiate the heat generated in the coil 10a with high efficiency. Further, as shown in the FIG. 6, by forming the fins 41 on the both side surfaces of the rotor 3a so as to cool the bearing holder portions 6a and 6b, it is possible to improve the property of heat radiation much more, due to the bearing holder portions 6a and 6b.

Figure 10A:
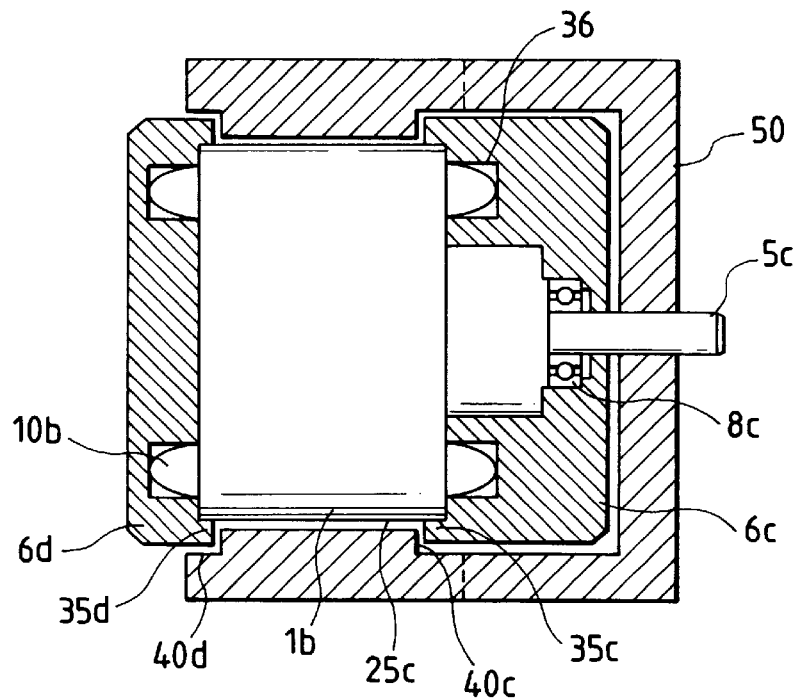
FIGS. 10(a) and (b) are views of showing an embodiment in which the motor structure of the present invention is applied, in particular, to an electric rotating machine of an outer rotor structure.

Next, another embodiment will be explained by referring to FIGS. 10, in which the motor structure according to the present invention is applied to an electric rotating machine having an outer rotor structure. Also in this embodiment, there is applied the assembling method, in which the fitting portion 35c and 35d of the bearing holder portions 6c and 6d of the stator 1b and the outer periphery surface 25b thereof are used as the reference surfaces directly. In this instance, because of the construction that the fitting portion 35c and 35d of the bearing holder portions 6c and 6d project toward the outer periphery side, as shown in the FIG. 10 (a), the rotor 50 also comes to have the cutting portions 40c and 40d at the both ends in the axial direction thereof, therefore it is possible to construct the motor, in which the decrease in the torque is scarcely brought about, comparing to the case of no such the cutting portion. In particular, in the rotor 50, the portion opposing to the stator 1b is formed as an unified or integrated body by caulking the laminated silicon steel sheets with caulking material, such as aluminum.

Further, the rotor 50 is fixed, at one side, to the axis 5c which is rotatably supported by the bearing 8c provided in the bearing holder portion 6c. In this manner, the portion which is to be fixed to the axis 5c, in the rotor 50, may be formed from metal material, such as aluminum, iron, etc. Or, the stator 1b is constructed with the coils 10b, which are inserted into the slots (not shown in the figure) formed in the outer periphery portion of the stator core 2b. And, the rotor 50 is supported by the bearing 8c provided in the bearing holder portion 6c only at one side thereof, and in this case, of course, the bearing holder portion 6d has no bearing therein and is attached so as to cover the other side of the stator 1b. When supporting the rotor 50 at the both sides thereof rotatably, the bearing may be provided in the bearing holder portion 6d, thereby to rotatably support the axis which is fixed to the other end of the rotor. Further, regarding the relationship between the bearing holder portions 6c and 6d and the stator 1b, it is sufficient that they are constructed in the same manner as in the embodiments which are shown in the FIGS. 1 to 3 and in FIG. 9.

Figure 10B:
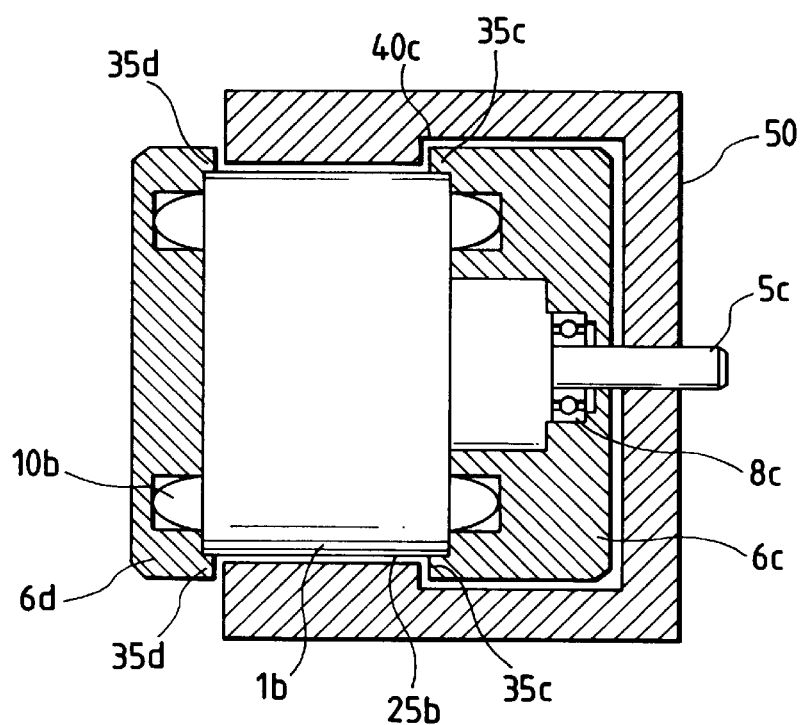

In the FIG. 10(b), the other end of the rotor 50 is shortened so as to avoid the interference with the fitting portion 35d of the bearing holder portion 6d. In this case, it brings about torque loss a little bit comparing to that shown in the FIGS. 10.

As is explained in the above, according to the present embodiment, it is possible to realize a motor (an electric rotating machine) having the structure for escaping the heat generated from the coil ends through thermal conduction with high efficiency, as well as being superior in assembling and recycling property thereof and being able to be disassembled easily.

Also, according to the present embodiment, in particular the outer frame, including the bearing holder portions, can be improved greatly in the assembling property thereof, therefore it is possible to realize the cost reduction, and further from a view point of material cost for the outer frame, the cost can be reduced greatly.

Next, an other embodiment will be explained by referring to FIGS. 11 to 19, with which small-sizing of the motor and improvement in heat radiation property can be obtained.

Figure 11:
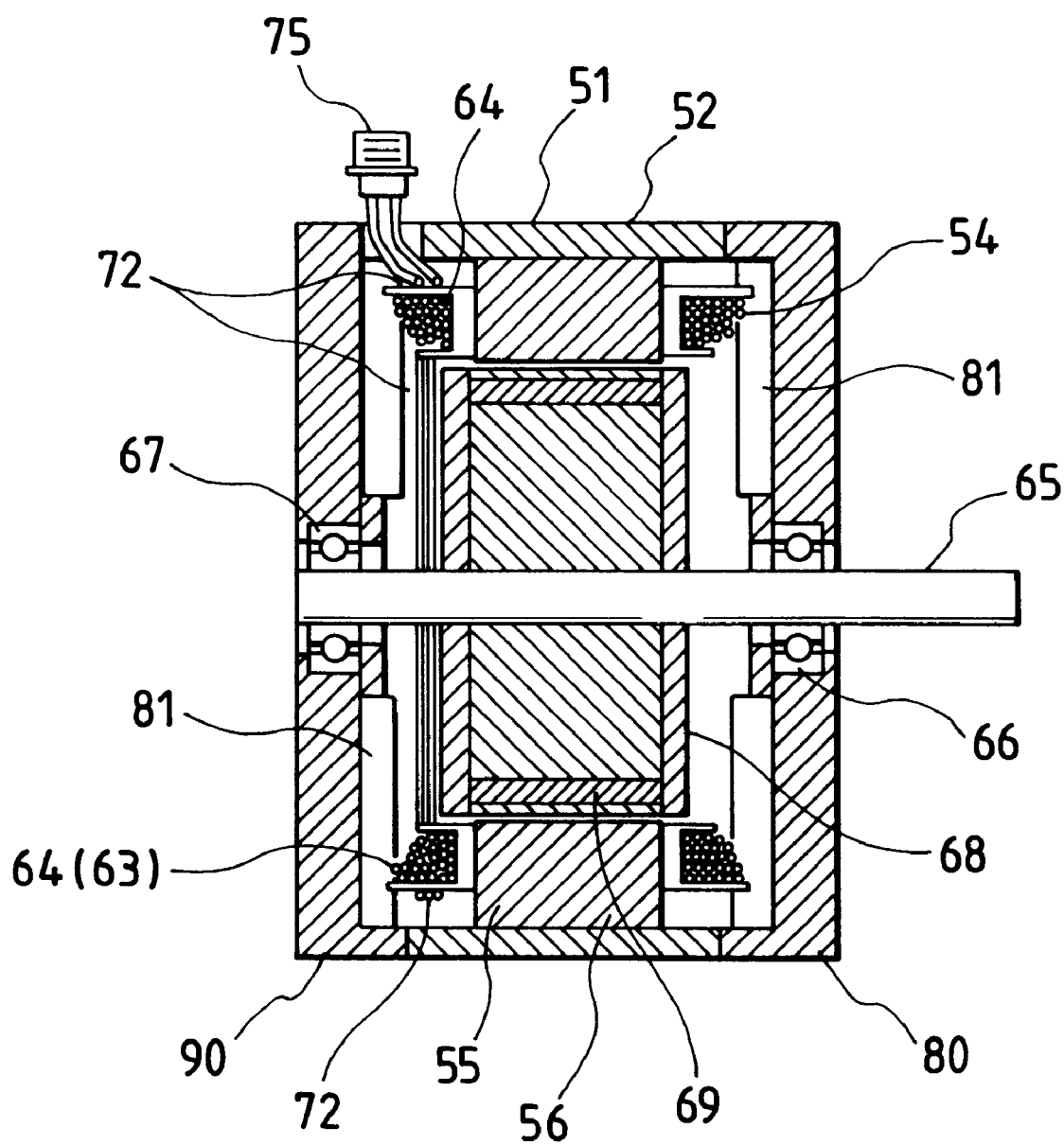
FIG. 11 is a vertical cross section view of a motor according to an other embodiment of the present invention.
Figure 12A:
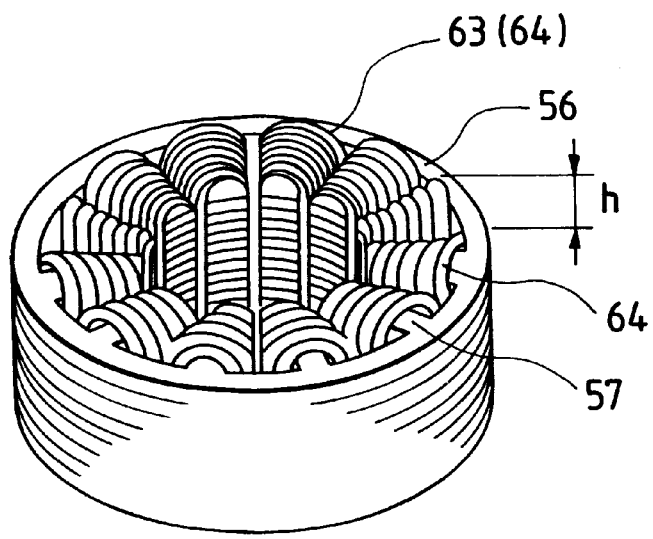
FIGS. 12(a) and (b) are conception views of a stator of concentrated winding.
Figure 13A:
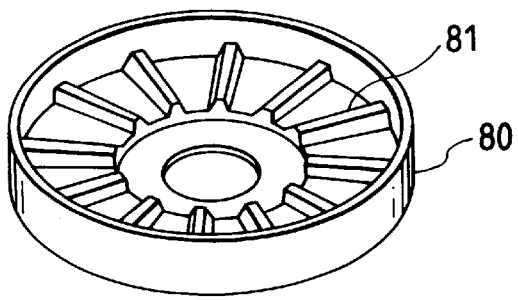
FIGS. 13(a) and (b) are perspective views of brackets of the embodiment mentioned above.
Figure 14:
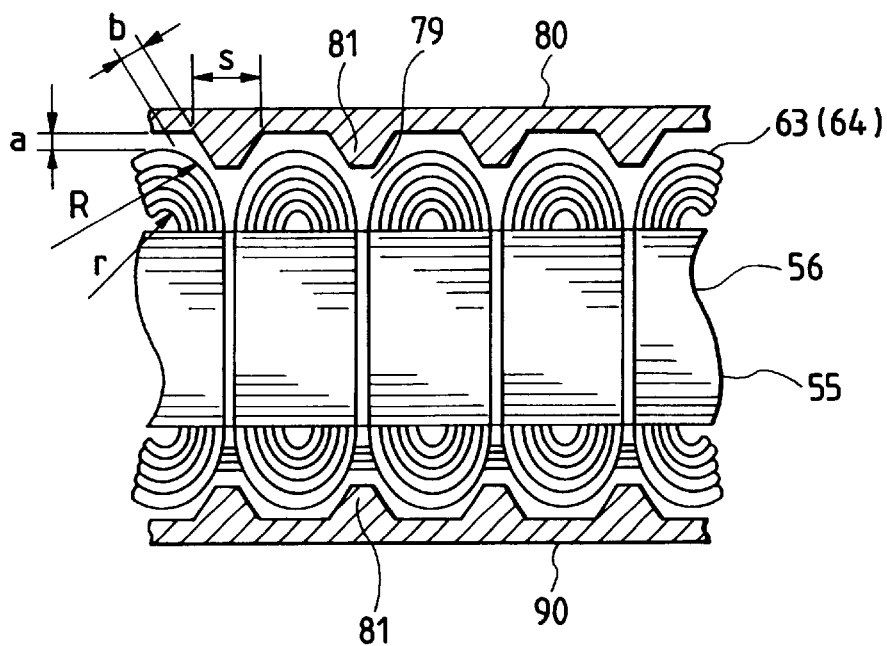
FIG. 14 is a view for explaining the principle aspect of the embodiment mentioned above.
Figure 15A:
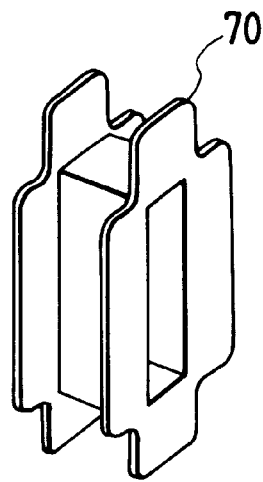
FIGS. 15(a) and (b) are perspective views of the stator coils which are used in the embodiment mentioned above.
Figure 16:
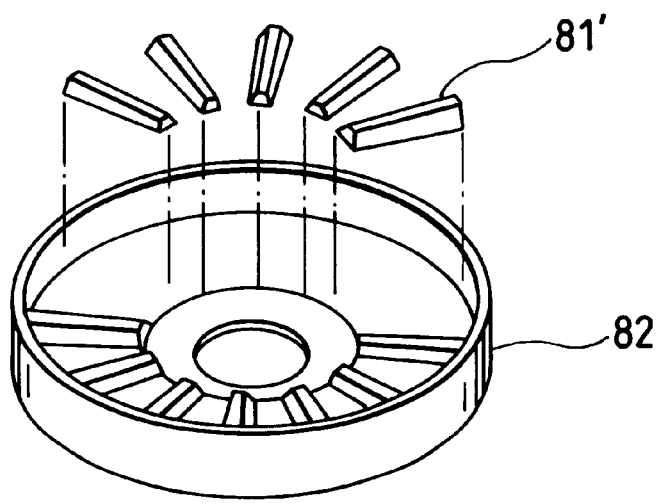
FIG. 16 is a perspective view of the bracket, in which reinforcing ribs are applied to, in relation to the embodiment mentioned above.

FIG. 11 is a vertical cross section view of a motor according to an other embodiment of the present invention;

FIGS. 12(a) and (b) are conception views of a stator of concentrated winding; FIGS. 13(a) and (b) are perspective views of brackets of the embodiment mentioned above; FIG. 14 is a view for explaining the principle aspect of the embodiment mentioned above; FIGS. 15(a) and (b) are perspective views of the stator coils which are used in the embodiment mentioned above; FIG. 16 is a perspective view of the bracket mentioned above, in which reinforcing ribs are applied to,; and FIG. 17 a perspective view of the bracket equipped with a cooling conduit.

As is shown in the FIG. 11, a motor 51 is constructed by comprising a housing 51, a stator 55 which is unified with a housing 52 by means of shrinkage fitting, etc., a rotor 68 which is unified with a rotation shaft 65 by means of also shrinkage fitting, etc., and motor brackets 80 and 90 (hereinafter, called by only "bracket(s)"), in which are installed bearings 66 and 67 for supporting the rotation shaft 65. The brackets 80 and 90 are positioned at the both ends in the axial direction of the motor.

The stator core 56 is provided with the concentrated winding therein, by winding stator coils 63 in each of the magnetic pole tooth 57. The coil 63 is positioned at a predetermined slots, thereby being assembled as the stator 55.

Connection portions 72 of the respective coils of the stator coils 63 are located along with the direction of periphery of the motor in an outside of the coil end 64, viewing from the rotation shaft 65 of the motor (i.e., in the radial direction of the motor).

Figure 12B:
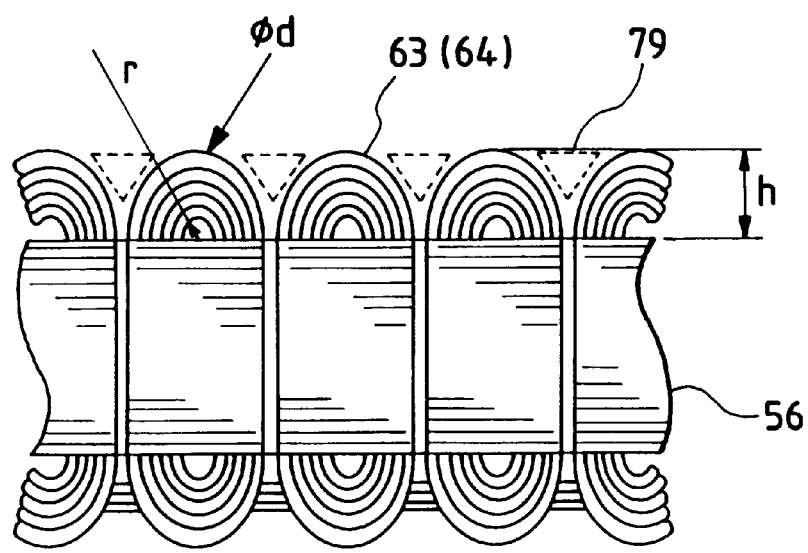

Here, the configuration of winding of the stator coils 63 will be explained by referring to the FIGS. 12. The FIG. 12(a) shows a perspective view of the stator in which the concentrated windings are provided, and the FIG. 12(b) the cross section view of the stator, being extended viewing from the axis of the motor.

When determining the shape of the winding framework and winding condition of the windings (i.e., the stator coils 63), the minimum winding radius of the wire and the winding tension are selected depending upon the film strength of the enamel wire to be used under the condition that the film will not be deteriorated when being wound. With the enamel wire applying plyamidoimide as the film thereof, for example, the minimum winding radius r is to be equal or larger than a half of the wire diameter, and in more preferable to be equal or larger than the wire diameter. Accordingly, the thicker the wire diameter d of the coil, the larger the minimum winding radius r of the coil. Therefore, when manufacturing the stator coil 63 in accordance with the concentrated windings, as shown in the FIG. 12(b), an aperture 79 is defined between the coil ends of neighboring coils, in a shape of an about triangle, within the height h thereof.

This aperture 79 is defined radially, between every coil end 64, therefore the number of it comes to the same to that of the stator coils and that of the magnetic pole teeth 57. The larger in the volume of the aperture, the lower the radiation efficiency towards outside the motor. Accordingly, by decreasing down the volume of the apertures, or alternatively by utilizing them, it is possible to obtain the motor of high efficiency, and also to achieve small-sizing and light-weighting of the motor. Hereinafter, a concrete example of it will be explained.

Figure 13B:
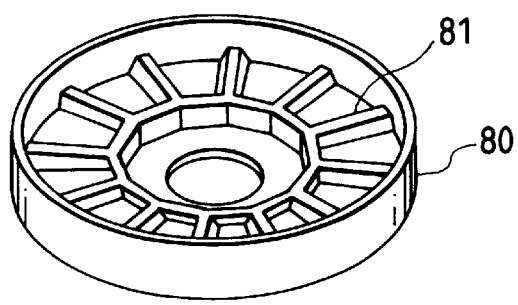

In the FIG. 13, an example is shown, wherein rib-like projections (hereinafter, being called by "rib(s)") 81 are provided radially on the inner side of the bracket 80, corresponding to the positions of (or at the positions nearly equal to) the apertures 79, each being defined between the coil ends 64. The cross section view of the motor, after being assembled by applying this bracket 80, is shown in the FIG. 11. The ribs 81 extend in the radial directions of the motor and are positioned at the positions, each corresponding to the center line between the neighboring teeth 7, and they enter into the apertures 79, each being defined between the coil ends after assembling the motor. The bracket 90 also has the ribs 81 in the same manner as mentioned in the above.

With provision of the ribs 81 in the brackets 80 and 90 being positioned in the apertures defined between the coil ends 64 in this manner, it is possible to increase the heat radiation of the stator coils through the ribs 81 to the brackets 80 and 90. Also, the ribs 81 can be received within the existing apertures 79 between the coil ends 64, therefore it is possible to improve the strength of the brackets, without elongating the motor as a whole in the axial direction thereof.

The ribs 81 provided radially are positioned between the coil ends of the stator coils, therefore the number thereof comes to be equal or less than the number of the coils or the teeth. Those brackets 80 and 90 are preferable to be formed together with the ribs shaped on the inner side thereof, and in the same manner of the conventional machining or processing method, they may be machined or processed by forging or forging with mold, by using material, such as aluminum, etc.

Next, the sizes of the ribs 81 are explained by referring to the FIG. 14. The FIG. 14 is a conceptual view of showing a relationship between the stator 55 in which the stator core 56 and the coils 63 are assembled, and the brackets 80 and 90 and the ribs 81 (i.e., the cross section of the stator being extended, from view point of the axis of the motor).

In the FIG. 14, when the enamel wire of wire diameter $\phi d$ is wound so that n layers of the wires are aligned in the periphery direction, an are radius R of outer radius of the coil end is $R \geq (r+n \times d)$, assuming that the minimum winding radius of the wire of that diameter is presented by r) . Here, as shown in the FIG. 14, assuming that the aperture between the coil end 64 and the brackets 80 (90) is a, the aperture between the ribs 81 is b, there can be considered the ribs forming almost a regular or equilateral triangle therewith, of a one side s, then $s=(3-\sqrt{2}) \cdot R + a - \sqrt{2} \cdot b$.

For example, if $d=\phi 1.6$, r=d, n=5, and a=b=1, there can be positioned the ribs defining almost the equilateral triangle in the cross section thereof, having the one side s=14.8 (i.e., in the trapezoidal shape) . Accordingly, by positioning the ribs 81 on the inner side of the brackets 80 and 90 radially, the aperture having inferior thermal conductivity is reduced in the volume, thereby increasing the heat radiation of the coil ends which can function as the heat source. Also, they can increase the hardness of the brackets, thereby reducing the vibration of the axes generated when the rotor rotates, as well as that generated in the brackets, etc.

In the motor assembled with the brackets 80 and 90 attached with the ribs mentioned above, for ensuring the voltage-resistance of insulation between the coils 63 and the brackets 80 or 90, it is preferable that the sizes a and b in the FIG. 14 is equal or greater than the insulation space distance, however the voltage-resistance can be ensured by positioning the insulator material between the above-mentioned brackets and the coils. In this instance, the sizes a and b in the FIG. 14 can be set to almost 0 (zero) under the condition that the insulator material lies between the coils 63 and the and the brackets 80 and 90, and further the heat radiation (or cooling property) can be also increased by making the thermal conductivity of the insulator material larger than that of the air.

As a methods for this, there are methods of treating the insulation process on the coil ends 64 and of treating the insulation process on the inner sides of the brackets. As such the method of treating the insulation process on the coil ends 64, there can be applied a method, in which the brackets are assembled after positioning the film-like insulator material bent to cover the upper portions (or the end portions) of the coil ends, or they may be bonded by use of a resin of thermally-curable property, such as sheet vanish, other than the film-like insulator sheet. Also, as the method for treating the insulation process on the inner sides of the brackets 80 and 90, the insulator material may be applied to or pasted by an electrodeposition coating on the inner side of the brackets, or the film-like sheet of the insulator material bent to cover the rib shapes on the inner side of the brackets may be positioned to be bonded thereto. As such the insulator material is selected from those which satisfy the insulation condition. For example, there may be used a film material of PPS, PET, polyamide, nylon, etc., or complex material pasted with aramid paper, etc.

Figure 19A:
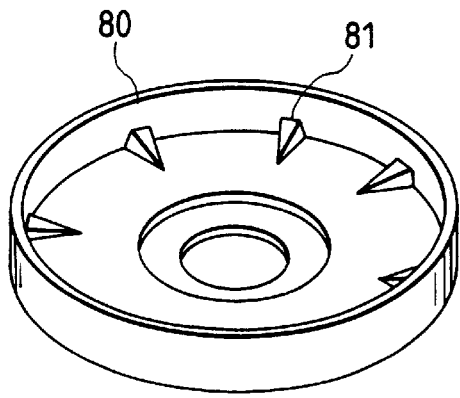
FIGS. 19(a) and (b) are views of the brackets which are used in the above embodiment.
Figure 19B:
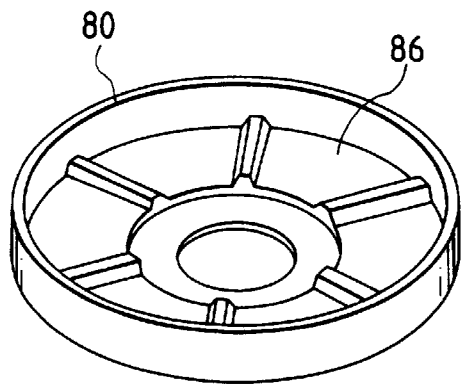
Figure 20:
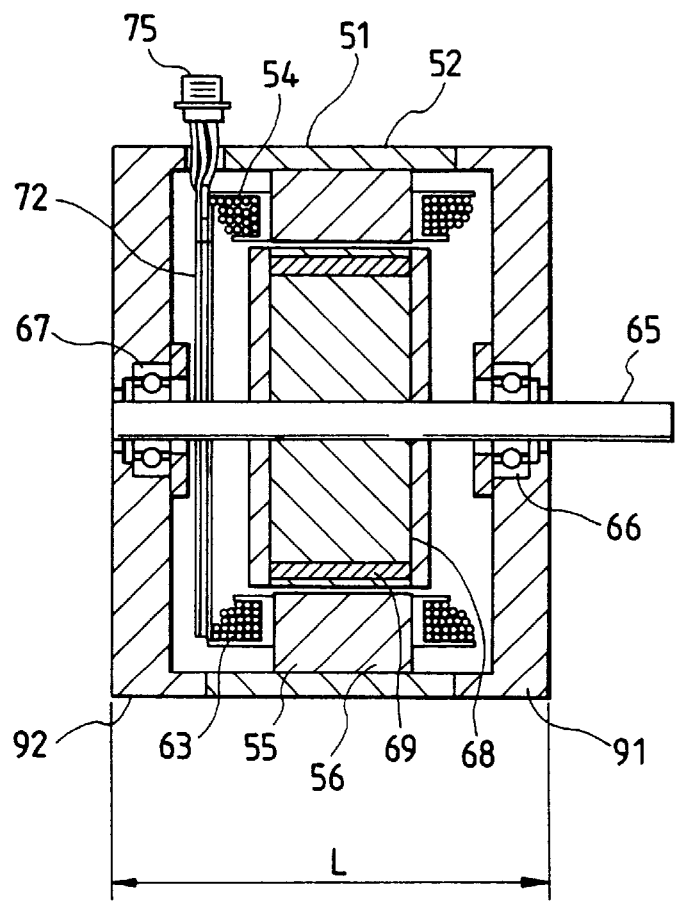
FIG. 20 is a cross section view of the motor according to the conventional art.

Also, other than the film of insulator material, as shown in FIG. 19(b), inside the bracket 80 may be positioned an elastic body 86 formed of silicon resin, etc., being superior in the heat-resistance and insulation. Assembling the motor with laying this elastic body between the brackets and the coil ends, the apertures between the coil ends and the brackets are reduced in the volume, thereby enabling to improve the cooling property (i.e., the heat radiation of the coils), as well as to reduce the vibration of the stator.

Next, the configuration in winding of the stator coil 63 will be explained by referring to the FIGS. 15.

Figure 15B:
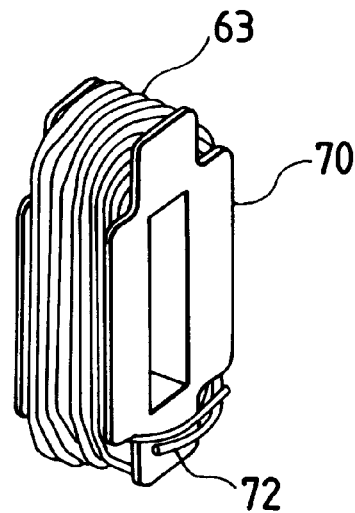

In the FIG. 15(a) is shown the shape of the insulator material which is wound around the stator coil 63, and in the FIG. 15(b) the shape of the coil after the winding thereof.

By making the shape of the insulator material (i.e., the winding framework) 70 being cut in a portion at the coil end portions thereof, the outer shaper or configuration of the coils comes to be able to be seen. As the result of this, as was mentioned in the above, it is possible to utilize the apertures defined from the configuration of the coil ends effectively. In this instance, the insulator material 70 is shaped roughly in a cross-like shape, seeing from the radial direction of the motor in the FIGS. 15, however it may be in other one(s), such as an oval shape, as far as it is in line with the configuration of the coil.

Also, as is shown in the FIG. 15(b), by positioning the coil ends 72 at the outer diameter side of the motor in the portion of the coil ends, the heights of the coil ends can be made almost equal to each other at the both ends. Also as this insulator material of the coil may be used the film materials as mentioned above, or the resin bobbin being formed.

In the FIG. 16, there is shown an another embodiment of the bracket mentioned above. In the present example, there is shown an embodiment, in which rib portions (blocks) 81' formed separate from the bracket (corresponding to the ribs 81 in the FIGS. 11, 13 and 14) are connected onto an inside of the bracket 82. Inside the bracket 80, the blocks 81', being the trapezoidal or the triangle in the cross section shape, are connected or bonded at the positions corresponding to the apertures 79 defined between the coils in a predetermined number thereof, therefore it has the same effect as the bracket 80 with the ribs mentioned above. As the method for connection, any one can be applied, being selected from the screw joint, gluing, welding, etc., however the screw joint is preferable from a view point of being strong in the strength and bringing about no deformation with heat.

In the method for insulating the rib portions and the coil, in the same manner as is mentioned in the above, the insulator material may be positioned between the ribs and brackets and the coils. Alternatively, the insulation process may treated only on the surface of the rib portions, or there may be used rib portions made of an engineering plastic material, being superior in the strength and heat-resistance, such as PPS, PEEK, etc. Or, the silicon material, having high insulation property and good thermal conductivity, may be used for forming the rib portions therefrom, and as the coating material thereof.

Figure 17:
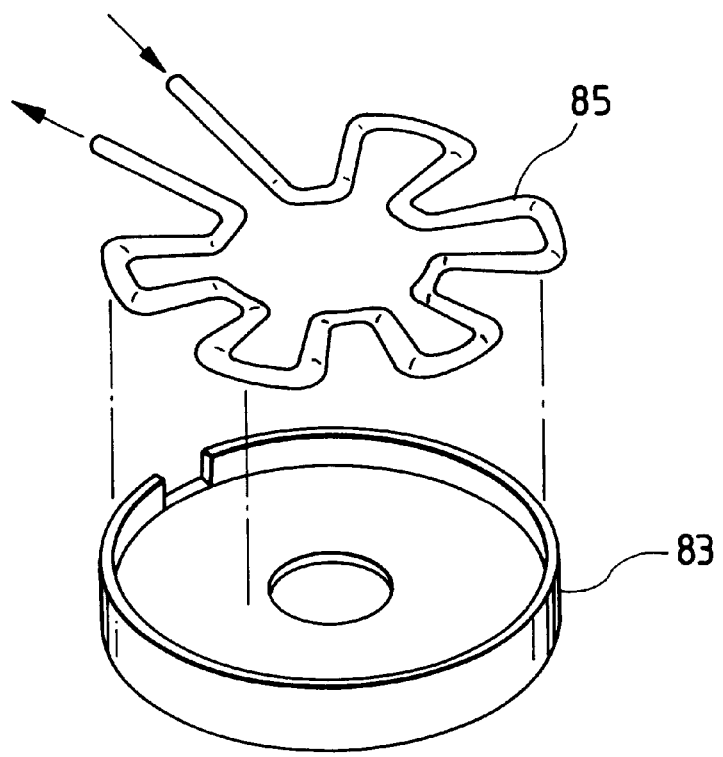
FIG. 17 a perspective view of the bracket equipped with a cooling conduit, in relation with other embodiment of the present invention.

An example of the bracket 83 according to the other embodiment of the present invention is shown in the FIG. 17.

The present example shows the embodiment, in which a conduit or pipe for use of cooling (i.e., a coolant passage) 85 is positioned in place of the ribs being in the projection shape as mentioned above, nearly at the same position thereof on the inner surface of the bracket 83. The conduit 85 for use of cooling is projected so as to be entered into the apertures 79 defined between the neighboring coil ends of the stator coil, but the other elements than that are same to those shown in the FIG. 11.

Circulating cooling water through the fluid passage defined by the conduit 85, in particular, it is possible to radiate the heat generated from the coil ends. In this instance, with the provision of the cooling passage at the position being near to the coil as the source of heat generation, it is possible to improve the cooling performance or function without lengthening the motor in the axial direction. The conduit is preferable to be formed of the material, such as copper, aluminum, etc., being superior in the thermal conductivity, and can be formed with ease by applying a bend forming thereon.

Also, in the FIG. 17, the conduit and the bracket are shown to be the parts separated from each other, however the bracket may be cast into a shape including a fluid passage predetermined provided therein, by means of the lost-wax method. And, as the method for obtaining the insulation between the conduit and the coils, in the same manner as mentioned in the above, the insulator material may be positioned between the bracket with the conduit and the coils. Also, the insulation treatment, such as the Teflon coating may be treated only on the surfaces of the conduit portions. In the case where the treatment for insulation is treated in this manner in the same manner as mentioned in the above, the apertures between the coils and the conduit for use of cooling can be made to be almost 0 (zero) in the volume.

Next, an other embodiment of the stator, in which the distributed windings are provided, will be explained by referring to the FIGS. 18 and 19.

Figure 18:
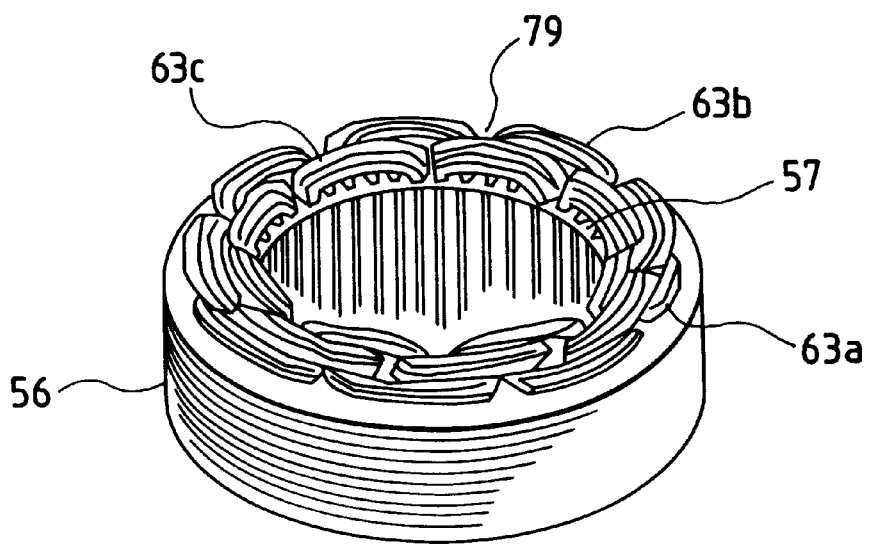
FIG. 18 is a perspective view of a stator of distributed winding which is used in the another embodiment of the present invention.

In the FIG. 18 is shown a perspective view of the stator of distributed windings for three (3) phases.

The coils 13*a*, 13*b* and 13*c* for the three phases are inserted (or wound) in a manner bridging over a plurality of magnetic pole teeth 7, respectively, and the stator coils are inserted in an order of 13*a*, 13*b* and 13*c*, thereby bringing the coil ends to be compiled in three layers, seeing into the radial direction from the motor axis.

In the figure, the stator coils 13*a* to 13*c* are wound almost in alignment, and they are manufactured and inserted with high accuracy, so that the configure of coil of the each layer come to be nearly equal to one another.

In this instance, in the same manner as the stator where the above-mentioned concentrated windings are provided, the apertures 79 are formed or defined between the coils neighboring to each other, being almost same to one another in the shape thereof. Accordingly, as shown in the FIG. 19(*a*), in the same manner in the stator where the above-mentioned concentrated windings are provided, there can be obtained the same effect as that of the embodiment (s) mentioned above, by providing the ribs 81 in projection shape at the nearly same positions of the apertures 79 between the coils, in radial directions, inside the bracket 80, and by making the ribs 81 enter into the apertures 79.

Also, in the FIG. 19(*b*), there is shown further other embodiment, in which is positioned the elastic body 86 formed of silicon material, etc., being,superior in the heat resistance, the thermal conductivity, and also in the insulating property, in an inside of the bracket 80. By assembling the motor with use of the bracket in which this elastic body is positioned, the elastic body 86 lies between the bracket and the coil ends, thereby enabling to reduce the apertures defined between the coil ends and the bracket in the volume thereof, so as to improve the cooling performance due to the heat radiation through this elastic body, as well as to improve the performance against the vibration of the stator.

In the FIG. 19(*a*), the ribs 81 are shown as the parts unified or integrated with the bracket 80 as an unit, however the bracket maybe strengthen by jointing with the ribs as the separated parts, as is mentioned in the above. Also, manufacturing the rib portions by use of silicon material, the engineering plastic, etc., or by coating the insulator material, such as silicon, the Teflon, etc., on the material having good thermal conductivity, such as copper, aluminum, etc., the heat radiation of the coils can be increased with reducing the apertures defined between the coils and the bracket.

The explanation given in the above is made only on the electric motor, however the present invention can be widely applied to electric rotating machinery, and it is apparent that the same effects can be also obtained in an electric dynamo or a generator, for example.

According to the present invention, there can be obtain an effect of realizing the electric rotating machine, being simple in the construction thereof, also being easy in disassembling thereof, thereby being environment-friendly from a view point of the recycling.

Also, according to the present invention, there can be realize an electric rotating machine which is small-sized and has high efficiency, by improving the heat radiation property thereof, as a result of this, there can be obtain effects of realizing the small-sizing and light-weighting of a set product in which the electric rotary machine is applied to, as well as the low-pricing thereof.

Also, according to the present invention, the assembling property thereof can be improved, thereby to realize an electric rotating machine, with which the cost reduction can be also obtained.

According to the first and the second inventions, with the method being different from the mold forming, it is possible to provide an electric rotating machine, with which the heat radiation property (i.e., output efficiency) can be increased while obtaining the small-sizing thereof (i.e., without lengthening the axial length of the motor) . Also, the projections provided inside the bracket for increasing the heat radiation property are constructed with the ribs, thereby the strength can be increased in the bracket.

Also, according to the second invention, there can be provided a motor showing low vibration and high heat radiation property, and further, by assembling the motor with positioning the elastic body part (s) between the coils and the bracket, a yield rate of the products can be increased, since no short-circuiting occurs between the lines therein.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. An electric rotating machine comprising:
   a stator being constructed by inserting coils into slots of a stator core thereof;
   an outer frame being divided into a plurality thereof, so as to cover periphery of the stator core of said stator; a pair of bearing holder portions, each being provided with a bearing at an axial center portion thereof, and being attached at both ends of said stator core so as to cover coil end portions dropping out at both sides of said stator;
   a fixing mechanism for fixing said outer frame at an outer periphery of the stator core, in connection with each of the bearing holder portions and said outer frame, by means of a function of attaching each of said pair of bearing holder portions at both sides of said stator core; and
   a rotor being rotatably supported by the bearings, each of which is provided in each of said bearing holder portions, respectively, and also being rotatably positioned within an inner diameter of said stator core at a desired distance therefrom, wherein
   said fixing mechanism has such structure that stresses are generated in said outer frames divided in the plurality thereof directing to an inner periphery thereof by screwing said bearing holder portions into an axial direction thereof, thereby squeezing the divided stator cores disposed therein in the inner periphery direction.

2. An electric rotating machine as defined in claim 1, wherein gutters for inserting the coil end portions therein are formed in each of said pair of bearing holder portions.

3. An electric rotating machine as defined in claim 2, wherein resin is injected in said gutters.

4. An electric rotating machine as defined in claim 1, wherein said stator is constructed by connecting on a ring-like core a plurality of teeth, in which the wound coils are inserted in advance.

5. An electric rotating machine as defined in claim 1, wherein said rotor is constructed with a cage-type rotor.

6. An electric rotating machine as defined in claim 1, wherein said rotor is constructed with a magnet type rotor.

7. An electric rotating machine comprising:
   a stator being constructed by inserting coils into slots of a stator core thereof;
   an outer frame being divided into a plurality thereof, so as to cover periphery of the stator core of said stator;
   a pair of bearing holder portions, each being provided with a bearing at an axial center portion thereof, and being attached at both ends of said stator core so as to cover coil end portions dropping out at both sides of said stator;
   a squeezing mechanism for fixing said outer frame at an outer periphery of the stator core, by a wedge function between each of said bearing holder portions and the outer frame due to a squeezing function of attaching the each of said pair of bearing holder portions at both sides of said stator core; and
   a rotor being rotatably supported by the bearings, each of which is provided in each of said bearing holder portions, and also being rotatably positioned within an inner diameter of said stator core at a desired distance therefrom, wherein
   said squeezing mechanism has such structure that stresses are generated in said outer frames divided in the plurality thereof directing to an inner periphery thereof by screwing said bearing holder portions into an axial direction thereof, thereby squeezing the divided stator cores disposed therein in the inner periphery direction.

8. An electric rotating machine as defined in claim 7, wherein said squeezing mechanism is constructed with a screw mechanism for joining a first tapered portion extending into an axial direction toward an axial center, formed at both sides of the outer frame, and a second tapered portion extending in the axial direction toward the axial center, formed on a side surface of each bearing holder portions.

9. An electric rotating machine as defined in claim 7, wherein gutters for inserting the coil end portions therein are formed in each of said pair of bearing holder portions.

10. An electric rotating machine as defined in claim 7, wherein said stator is constructed by connecting on a ring-like core a plurality of teeth, in which the wound coils are inserted in advance.

11. An electric rotating machine as defined in claim 7, wherein said rotor is constructed with a cage-type rotor.

12. An electric rotating machine as defined in claim 7, wherein said rotor is constructed with a magnet type rotor.

13. An electric rotating machine comprising:
    a stator being constructed by inserting coils into slots of a stator core thereof;
    an outer frame being divided into a plurality thereof, so as to cover periphery of the stator core of said stator;
    a pair of bearing holder portions, each having a fitting portion to be fitted into one of inner diameter reference surfaces at both end portions of said stator and being provided with a bearing at an axial center portion thereof, and being attached at both ends of said stator core so as to cover coil end portions dropping out at both sides of said stator;
    a fixing mechanism for fixing said outer frame at an outer periphery of the stator core, in connection with each of the bearing holder portions and said outer frame, by means of a function of attaching each of said pair of bearing holder portions to both sides of said stator core; and
    a rotor being rotatably supported by the bearings, each of which is provided in each of said bearing holder portions, having an axis being longer than axial length of the stator core of said stator, being formed with an escaping portion for escaping from an outer diameter of a portion opposing to a fitting portion of each of said bearing holder portion, and also being rotatably positioned within an inner diameter of said stator core at a desired distance therefrom, wherein
    said fixing mechanism has such structure that stresses are generated in said outer frames divided in the plurality thereof directing to an inner periphery thereof by screwing said bearing holder portions into an axial direction thereof, thereby squeezing the divided stator cores disposed therein in the inner periphery direction.

14. An electric rotating machine as defined in claim 13, wherein gutters for inserting the coil end portions therein are formed in each of said pair of bearing holder portions.

15. An electric rotating machine as defined in claim 13, wherein said stator is constructed by connecting on a ring-like core a plurality of teeth, in which the wound coils are inserted in advance.

16. An electric rotating machine as defined in claim 13, wherein said rotor is constructed with a cage-type rotor.

17. An electric rotating machine as defined in claim 13, wherein said rotor is constructed with a magnet type rotor.

18. An electric rotating machine comprising:

a stator being constructed by inserting coils into slots of a stator core thereof;

an outer frame being divided into a plurality thereof, so as to cover periphery of the stator core of said stator;

a pair of bearing holder portions, each having a fitting portion to be fitted into one of inner diameter reference surfaces at both end portions of said stator and being provided with a bearing at an axial center portion thereof, and being attached at both sides of said stator core so as to cover coil end portions dropping out at the both sides of said stator;

a squeezing mechanism for fixing said outer frame at an outer periphery of the stator core, by a wedge function between each of said bearing holder portions and the outer frame due to a squeezing function of attaching the each of said pair of bearing holder portions at both sides of said stator core; and a rotor being rotatably supported by the bearings, each of which is provided in each of said pair of bearing holder portions, having an axis being longer than axial length of the stator core of said stator, being formed with an escaping portion for escaping from an outer diameter of a portion opposing to a fitting portion of each of said bearing holder portion, and also being rotatably positioned within an inner diameter of said stator core at a desired distance therefrom, wherein said squeezing mechanism has such structure that stresses are generated in said outer frames divided in the plurality thereof directing to an inner periphery thereof by screwing said bearing holder portions into an axial direction thereof, thereby squeezing the divided stator cores disposed therein in the inner periphery direction.

19. An electric rotating machine as defined in claim 18, wherein said squeezing mechanism is constructed with a screw mechanism for joining a first tapered portion extending into an axial direction toward an axial center, formed at both sides of the outer frame, and a second tapered portion extending in the axial direction toward the axial center, formed on a side surface of each bearing holder portions.

20. An electric rotating machine as defined in claim 18, wherein gutters for inserting the coil end portions therein are formed in each of said pair of bearing holder portions.

21. An electric rotating machine as defined in claim 18, wherein said stator is constructed by connecting on a ring-like core a plurality of teeth, in which the wound coils are inserted in advance.

22. An electric rotating machine as defined in claim 18, wherein said rotor is constructed with a cage-type rotor.

23. An electric rotating machine as defined in claim 18, wherein said rotor is constructed with a magnet type rotor.

24. An electric rotating machine comprising:

a stator being constructed by inserting coils into slots of a stator core thereof;

a first bearing holder portion, having a fitting portion to be fitted to an outer diameter reference surface at one end of said stator, being provided with a bearing at an axial center portion thereof, and being attached at one end of said stator core so as to cover coil end portions dropping out at the one end of said stator;

a second bearing holder portion, having a fitting portion to be fitted to an outer diameter reference surface at the other end of said stator, and being attached at the other end of said stator core so as to cover coil end portions dropping out at the other end of said stator; and a cylindrical rotor being rotatably supported by the bearing provided in said first bearing holder portion, being formed with an escaping portion for escaping from an outer diameter of a portion opposing to a fitting portion of said first bearing holder portion, and also being rotatably positioned within an inner diameter of said stator core at a desired distance therefrom.

25. An electric rotating machine comprising:

a stator being constructed by inserting coils into slots of a stator core thereof;

a first bearing holder portion, having a fitting portion to be fitted to an outer diameter reference surface at one end of said stator, being provided with a bearing at an axial center portion thereof, and being attached at one end of said stator core so as to cover coil end portions dropping out at the one end of said stator;

a second bearing holder portion, having a fitting portion to be fitted to an outer diameter reference surface at the other end of said stator, and being attached at the other end of said stator core so as to cover coil end portions dropping out at the other end of said stator; and a cylindrical rotor being rotatably supported by the bearing provided in said first bearing holder portion, having an axis being longer than an axial length of the stator core of said stator, being formed with escaping portions for escaping from outer diameters of portions opposing to the fitting portions of said first and second bearing holder portions, and also being rotatably positioned within an inner diameter of said stator core at a desired distance therefrom.

26. An electric rotating machine comprising:

a stator being constructed by inserting coils into slots of a stator core thereof;

a pair of bearing holder portion, each having a fitting portion to be fitted to an outer diameter reference surface at both ends of said stator and being provided with a bearing at an axial center portion thereof, and being attached at the both ends of said stator core so as to cover coil end portions dropping out at the both ends of said stator; and a cylindrical rotor being rotatably supported by the bearings, each of which is provided in each of said pair of bearing holder portions, having an axis being longer than axial length of the stator core of said stator, being formed with escaping portion for escaping from each outer diameter of a portion opposing to the each fitting portion of said bearing holder portions, and also being rotatably positioned within an inner diameter of said stator core at a desired distance therefrom.

27. An electric rotating machine comprising:

a stator being positioned with magnetic pole teeth therein;

a stator coil being wound round on each of the magnetic pole teeth or being wound covering a plurality of the magnetic pole teeth; and a bracket being positioned in an axial direction of said electric rotating machine, wherein projections are provided inside said bracket, to be entered into apertures defined between coil ends of said stator coil neighboring to each other.

28. An electric rotating machine, as defined in claim 27, wherein said projections are formed by rib-like projections, which are positioned inside said bracket radially.

29. An electric rotating machine as defined in claim 27, wherein an insulator material lies between an inside of said bracket and the coil ends of said stator coil.

30. An electric rotating machine, as defined in claim 29, wherein at least one of an inside surface of said bracket and the coil ends of said stator coil is treated with an insulating process.

31. An electric rotating machine, as defined in claim 29, wherein said insulator material has elasticity.

32. An electric rotating machine comprising:

a stator being positioned with magnetic pole teeth therein;

a stator coil being wound around each of the magnetic pole teeth or being wound covering a plurality of the magnetic pole teeth; and a bracket being positioned in an axial direction of said electric rotating machine, wherein coolant passage is provided inside said bracket, and being projected to be entered into apertures defined between coil ends of said stator coil neighboring to each other.

33. An electric rotating machine as defined in claim 32, wherein insulator material lies between an inside of said bracket and the coil ends of said stator coil.

34. An electric rotating machine comprising:

a stator being positioned with magnetic pole teeth therein;

a stator coil being wound round on each of the magnetic pole teeth or being wound covering a plurality of the magnetic pole teeth; and a bracket being positioned in an axial direction of said electric rotating machine, wherein an elastic body having insulating property therewith is positioned on an inside surface of the bracket, and the elastic body lies between coil ends of said stator coil and the inside surface of the bracket.

* * * * *